US011975505B2

(12) United States Patent
Dueweke

(10) Patent No.: US 11,975,505 B2
(45) Date of Patent: May 7, 2024

(54) AUTOMATED PAPER CONE SHAPING AND ARRANGEMENT MACHINE

(71) Applicant: Sesh Technologies Manufacturing Inc., Spokane, WA (US)

(72) Inventor: Jason Dueweke, Deer Park, WA (US)

(73) Assignee: Sesh Technologies Manufacturing Inc., Spokane, WA (US)

(*) Notice: Subject to any disclaimer, the term of this patent is extended or adjusted under 35 U.S.C. 154(b) by 545 days.

(21) Appl. No.: 17/108,604

(22) Filed: Dec. 1, 2020

(65) Prior Publication Data

US 2022/0168987 A1 Jun. 2, 2022

(51) Int. Cl.
*B31F 1/00* (2006.01)

(52) U.S. Cl.
CPC .................................. *B31F 1/0077* (2013.01)

(58) Field of Classification Search
CPC . B31F 1/00; B31F 1/0077; A24C 5/54; A24C 5/04; A24C 5/39
See application file for complete search history.

(56) References Cited

U.S. PATENT DOCUMENTS 1,299,050 A * 4/1919 Southmayd .............. A24C 5/42 24/11 CC
1,528,248 A * 3/1925 Dunlap ..................... B31C 7/08 493/296
2,719,466 A 10/1955 Wittkuhns et al.
5,105,830 A * 4/1992 Brackmann .............. A24C 5/40 131/72
2011/0011411 A1 1/2011 Accordino et al.
2017/0042218 A1* 2/2017 Sinclair, Jr. ............ A24D 1/022
2017/0119043 A1* 5/2017 Swanson .................. A24C 5/42
2020/0170293 A1 6/2020 Kesselman et al.
2020/0329756 A1 10/2020 Karim

FOREIGN PATENT DOCUMENTS

EP 1374705 A1 * 1/2004 .............. A24C 5/42

OTHER PUBLICATIONS

The International Search Report and Written Opinion for PCT Application No. PCT/US21/59769, dated Feb. 22, 2022, 9 pages.

* cited by examiner

*Primary Examiner* — Chelsea E Stinson
(74) *Attorney, Agent, or Firm* — Lee & Hayes, P.C.

(57) ABSTRACT

Systems and methods for an automated paper cone shaping and arrangement machine are disclosed. A paper cone shaping and arrangement machine may comprise a support frame, an actuator, a transport implement, a cone shaping implement, a cone rolling implement, a securing implement, a paper dispensing implement, a support material dispensing implement, an ejector implement, and/or a display. The support frame is configured to provide support for components of the cone machine. The cone shaping implement, cone rolling implement, and/or securing implement may be configured to shape and seal the paper cones. The paper dispensing implement and/or the support material dispensing implement may be configured to dispense material to the cone machine. The ejector implement may be configured to transport paper cones from the cone machine to a storage. The cone machine may be configured to shape a paper-like material into a paper cone comprising a support material disposed therein.

20 Claims, 9 Drawing Sheets

AUTOMATED PAPER CONE SHAPING AND ARRANGEMENT MACHINE

BACKGROUND

Machines may be used to automate manufacturing processes. Machines may be designed to produce a manufactured product comprising delicate materials that are required to be combined in specific manner. Described herein are improvements in technology and solutions to technical problems that may be used to, among other things, enhance the experience for users producing a manufactured product.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
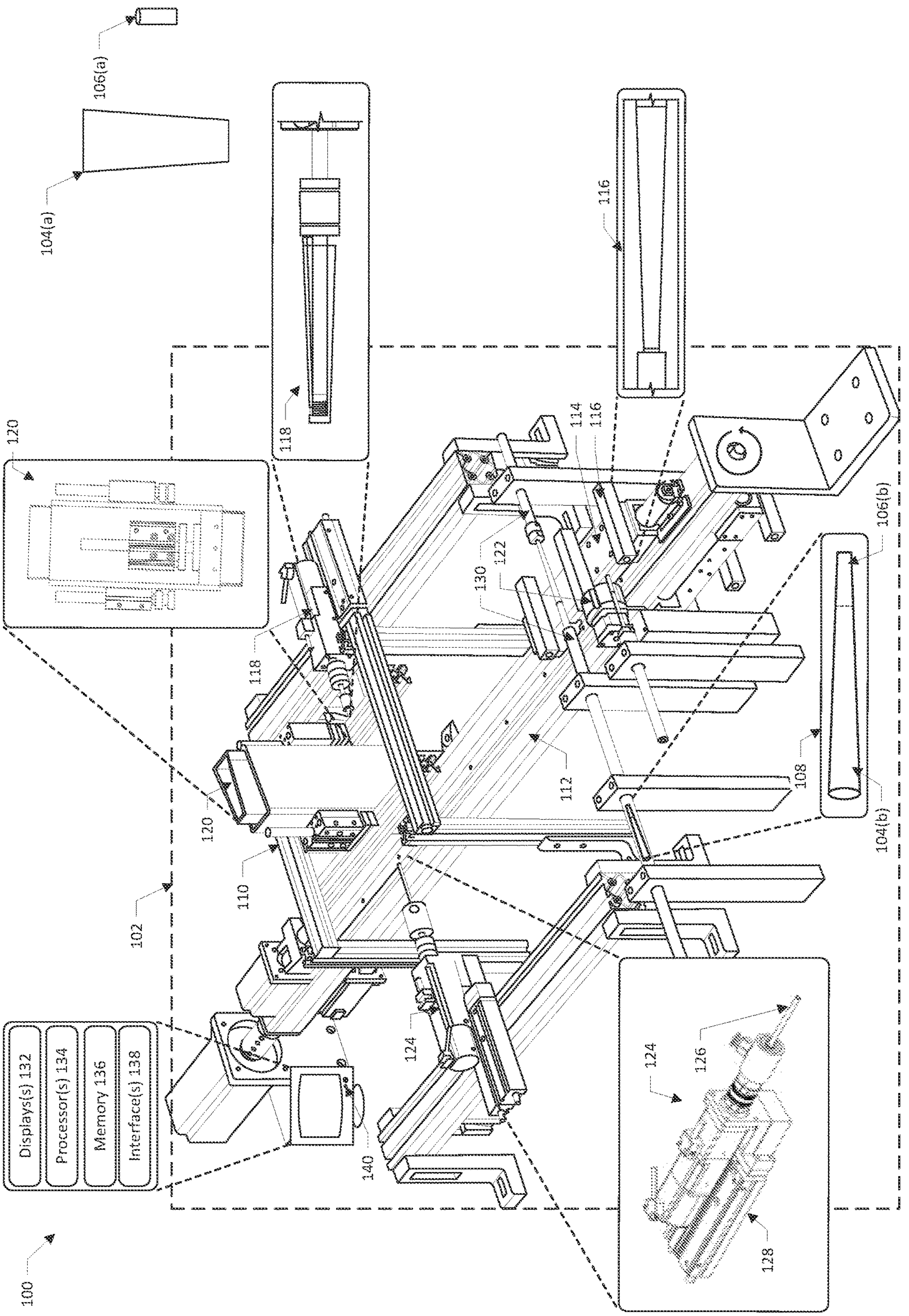
FIG. 1 illustrates a schematic diagram of an example automated paper cone shaping and arrangement machine system.

An automated paper cone shaping and arrangement machine (hereinafter, "the cone machine") and systems for use thereof are disclosed. Take for example, an environment having unpackage processed agricultural material where one or more users reside. Such users may desire to package a desired quantity of the processed agricultural material by themselves for repurpose use. Such desired packaging may have established a standardized shape, size, and/or components for repurpose use. However, such a desired packaging may be in a shortage and/or difficult to manufacture by hand. The cone machine may be configured with various components for shaping a paper-like material into a paper cone having a shape, size, and/or components that are desired and/or have been made a standard for repackaging agricultural material for repurpose use. In some examples, the shape of the paper cone may be substantially conical. In some examples, the paper-like material may be comprised of at least one of refined white paper, unrefined brown paper, recycled paper, hemp paper, palm leaf, and/or anything containing substantially similar qualities. In some examples, the paper cone may include a paper-like support material (hereinafter, "the support material") disposed therein. In some examples, the support material may be substantially cylindrical and/or conical in shape. In some examples, the support material may have a more favorable rigidity than the paper-like material used to shape the paper cone, such that the support material provides substantial support for at least a portion of the paper cone. In some examples, the support material may be comprised of at least one of refined white paper, unrefined brown paper, recycled paper, hemp paper, palm leaf, and/or anything containing substantially similar qualities. Additionally, or alternatively, the support material may be configured to obstruct the processed agricultural material while allowing for air to pass therethrough.

The components of the cone machine may be arranged in various combinations and/or orientations. The cone machine may be configured with a variety of shaping mechanism configurations including various components, also referred to as implements. An example shaping mechanism may be configured such that a paper-like material is shaped into the paper cone with a paper-like support material disposed therein. Example shaping mechanism configurations may include at least a cone shaping implement configured to receive and/or shape the paper-like material into the paper cone. Example shaping mechanism configurations may also include an actuator configured to transport at least the cone shaping implement between various components of the cone machine. Example shaping mechanism configurations may also include at least one cone rolling implement configured to roll and/or assist with shaping the paper-like material into the paper cone. In some examples, the cone shaping implement may be sized to receive the cone rolling implement such that the cone shaping implement and the cone rolling implement may be utilized together to shape the paper-like material into the cone shape and/or the standard shape. Example shaping mechanism configurations may also include at least one paper dispensing implement configured to house, arrange, and/or dispense the paper-like material. Example shaping mechanism configurations may also include at least one support material dispensing implement configured to house, transport, arrange, and/or dispense the support material. Example shaping mechanism configurations may also include at least one stabilizing implement configured to substantially secure and/or stabilize at least a portion of the paper cone, such as, for example, the support material. Example shaping mechanism configurations may also include at least one ejecting implement configured to eject the paper cone from the shaping implement. Example shaping mechanism configurations may also include at least one chute or tube configured to transport the paper cone from the cone machine to a storage without damaging the paper cone. Example shaping mechanism configurations may include one or more motors configured to cause the components to perform operational tasks such as, for example, rotate, extend, retract, actuate, and/or cause any of the components described herein to perform an associated desired operation.

The cone machine may be configured such that the one or more components are fixed to a support frame. In some examples, the support frame may be configured to arrange the components in a particular manner and/or may provide a fixed position for the components such that the components may be utilized together with precision. The cone machine may also be configured such that a user may utilize a display mounted on the support frame of the cone machine presenting a graphical user interface (GUI) to control the operation task, speed, and/or percentage of available power from the motor, and/or choose from various shaping techniques there within. The cone machine may be configured such that the paper cones are routed from the cone machine and arranged in a storage or housing that may be separate from the cone machine.

To illustrate, an example automated cone shaping and arrangement environment may have a first container with paper-like material and/or a second container with support material disposed on a surface therein. The paper-like material may be sized to be placed in the paper dispensing implement. For example, the paper-like material may be shaped such that a stack of the paper-like material may be placed in the paper dispensing implement. The paper-like material may be configured to form the paper cone. In some examples, the paper cone may comprise the support material.

As will be discussed in more detail below, the cone machine may be comprised of separate parts in combination with one another, such as, for example, a support frame, one or more motors, an actuator, a cone shaping implement, a cone rolling implement, a paper dispensing implement, a support material dispensing implement, a securing implement, an ejector implement, a display, and/or one or more buttons. The support frame may provide support for the one or more components of the cone machine. The support frame may be configured such that the components may be arranged in various manners, such that the cone machine may utilize various shaping techniques, such as, for example, multiple shaping operations executing simultaneously, shaping of paper cones having various sizes, and/or shaping operations executing at various speeds. The one or more motors may be configured such that a user may specify a speed, such as, for example, a percentage of available power from the motor at which the motor will operate. In some examples, the motor may be configured to operate at any value from 0 to 100 percent of the available power from the motor, where 0 percent may be the lowest available power from the motor and 100 percent may be the highest available power from the motor. The motor may be configured such that it provides operational power to a number of components of the cone machine at the speed specified by the user.

The actuator may be arranged in a number of ways. For example, the actuator may be secured to the support frame. Additionally, or alternatively, the actuator may have a standalone support frame. In some examples, the actuator may be configured to include a first end and a second end being opposite the first end. The actuator may further be configured to travel in at least a first direction of travel and a second direction of travel. In some examples, the actuator may be configured using various techniques, such as, for example, as a ball screw having a first end attached to a drive bearing and a second end being opposite the first end and attached to a support bearing. Additionally, or alternatively, the ball screw may comprise a linear motion bearing threaded onto the ball screw and configured to travel between the first end and the second end as the ball screw rotates. In some examples, the actuator may be configured as a pulley, a belt, and/or any other means having a two-way linear direction of travel. In some examples, the actuator may include a transport implement coupled thereto. As an example, an actuator implemented as a ball screw may have the transport implement coupled thereto the linear motion bearing such that the transport implement may travel between ends of the actuator along with the linear motion bearing. Additionally, or alternatively, the transport implement may provide support for one or more additional components, such as, for example, one or more cone shaping implements. Additionally, or alternatively, the actuator may be configured to rotate about its longitudinal axis, such that, the actuator may be able to facilitate various arrangements of the cone machine. For example, the cone machine may be arranged such that some components may be positioned above the actuator and/or some components may be positioned below the actuator, and the actuator may travel in the first and/or second direction(s) of travel between the first end and the second end and/or may rotate such that components coupled to transport implements disposed on a top side of the actuator may access components that are positioned on a bottom side of the actuator, for example.

The cone shaping implement may be arranged in a number of ways. For example, the cone shaping implement may be coupled to a transport implement. Additionally, or alternatively, the cone shaping implement may be secured to the support frame. Additionally, or alternatively, the cone shaping implement may have a standalone support frame. In some examples, the cone shaping implement may have a first end with a first opening having a first diameter. Additionally, or alternatively, the cone shaping implement may have a second end with a second opening having the first diameter. Additionally, or alternatively, the cone shaping implement may have a cavity extending between the first opening and the second opening along a longitudinal axis of the cone shaping implement. Additionally, or alternatively, the cone shaping implement may have an exterior surface. Additionally, or alternatively, the cone shaping implement may have a slit extending from the exterior surface to the cavity. In some examples, the cavity may be defined by various portions. For example, the cavity may include a first portion that extends a first length along the longitudinal axis from the first opening. In some examples, the first portion may be cylindrical in shape and/or may have the first diameter. Additionally, or alternatively, the cavity may include a second portion that extends a second length along the longitudinal axis from the second opening. In some examples, the second portion may be cylindrical in shape, have the first diameter, and/or extend a second length that is greater than the first length. Additionally, or alternatively, the cavity may include a third portion connecting the first portion and the second portion. In some examples, the third portion may taper from the first portion to the second portion along the longitudinal axis of the cone shaping implement and from the first diameter to a second diameter that is less than the first diameter. In some examples, the third portion may be a third length that is greater than the second length and/or the third length. In some examples, the slit may be sized the third length and aligned with the third portion. Additionally, or alternatively, the slit may be sized to receive the paper-like material.

In some examples, the cone shaping implement may be configured to receive and/or shape the paper-like material into the paper cone. In some examples, the cone shaping implement may be configured to receive the paper-like material via the slit. For example, the paper-like material may be dispensed in a manner such that the paper-like material enters the cavity of the cone shaping implement via the slit, and may wrap around the cavity of the cone shaping implement, causing the paper-like material to take the conical shape of the paper cone. Additionally, or alternatively, the cone shaping implement may be configured to receive the support material via the first opening and/or the second opening. In some examples, the paper-like material may form the paper cone wrapping around encapsulating the support material. Additionally, or alternatively, the cavity of the cone shaping implement may be sized to receive a cone rolling implement, such that, the cone shaping implement, the cone rolling implement, and/or any other components/implements described herein may be utilized in any combination to shape the paper-like material into the paper cone. Additionally, or alternatively, the first opening and/or the second opening may be sized to receive at least a portion of a securing implement, such that, the cone shaping implement, the securing implement, and/or any other components/implements described herein may be utilized in any combination to shape the paper-like material into the paper cone.

The cone rolling implement may be arranged in a number of ways. For example, the cone rolling implement may be secured to the support frame. Additionally, or alternatively, the cone rolling implement may have a standalone support frame. Additionally, or alternatively, the cone rolling implement may include one or more motors configured to actuate at least a portion of the cone rolling implement. Additionally, or alternatively, the cone rolling implement may have a shaft component, a mandrel component, a member attached to the shaft, and/or a spring. In some examples, mandrel component may be sized such that it may be inserted into the cavity of the cone shaping implement. In some examples, the shaft may have a proximal end and a distal end. In some examples, the mandrel component may be of a first length that is substantially similar to the length of the third portion of the cone shaping implement, as described above. In some examples, the mandrel component may be coupled to the shaft in such a manner that the mandrel component need not be fixed to the shaft. The mandrel component may have a proximal end having a first diameter that is substantially equal to the first diameter of the third portion of the cavity of the cone shaping implement described above. In some examples, the mandrel component may have an opening disposed on the proximal end. Additionally, or alternatively, the mandrel component may have a distal end having a second diameter that is substantially equal to the second diameter of the third portion of the cavity of the cone shaping implement described above. Additionally, or alternatively, the mandrel component may have an exterior surface. Additionally, or alternatively, the mandrel component may have a receptacle extending from the opening a second length that is less than the first length and sized to receive the shaft. Additionally, or alternatively, the mandrel component may have a channel extending between the exterior surface and the receptacle. In some examples, the channel may be sized such that the member attached to the shaft may be positioned in the channel. The member may have an edge that may be positioned substantially even with the exterior surface of the mandrel component and/or may be configured to protrude past the exterior surface. In some examples, the edge may be comprised of a material configured to have a level of friction greater than that of the exterior surface of the mandrel component. For example, the edge may be comprised of a rubber material, a silicon material, a nitrile material, a neoprene material, a vinyl material, or any other material having a friction that is greater than that of the exterior surface of the mandrel component. The spring may be disposed in the receptacle between the distal end of the shaft and the distal end of the mandrel component.

In some examples, the cone rolling implement may be configured to perform various operations. In some examples, the cone rolling implement may be configured to rotate about a longitudinal axis of the shaft and/or mandrel. Additionally, or alternatively, the cone rolling implement may be configured to extend from a retracted state to an extended state and/or retract from the extended state to the retracted state. In some examples, the extending and retracting operations may be performed via an actuator coupled to the cone rolling implement and/or the support frame, such as, for example, an air shuttle. In some examples, the extended state may position the mandrel in the cavity of the cone shaping implement. Additionally, or alternatively, once the mandrel has been positioned in the cavity, the shaft may compress the spring, causing the member to slide in the channel of the mandrel and causing the edge of the member to protrude beyond the exterior surface of the mandrel. In some examples, the retracted state may position the mandrel component outside of the cavity and/or decompress the spring.

In an example operation, the air shuttle may extend the cone rolling implement to the extended state such that the mandrel is positioned in cavity of the cone shaping implement. As the mandrel makes contact with an inside of the cavity, the spring may begin to compress causing the edge of the member to protrude beyond the exterior surface of the mandrel. The edge of the member may protrude beyond the exterior surface of the mandrel and may contact at least a portion of the paper-like material disposed in the cavity. The cone rolling implement may begin rotation to shape the paper-like material into the paper cone. Additionally, or alternatively, the cone rolling implement may begin rotation such that the edge of the member may assist in feeding the paper-like material through the slit of the cone shaping implement and into the cavity. Additionally, or alternatively, the cone rolling implement may cease rotation, and the air shuttle may begin retracting the cone rolling implement from the extended state to the retracted state. The spring begins decompressing, causing the edge of the member to regress back to a substantially even position with the exterior surface of the mandrel, where the edge may no longer contact the paper like material and allow for removal of the cone rolling implement without damaging or removing the paper cone.

The paper dispensing implement may be arranged in a number of ways. For example, the paper dispensing implement may be secured to the support frame. Additionally, or alternatively, the paper dispensing implement may have a standalone support frame. Additionally, or alternatively, the paper dispensing implement may include a motor configured to actuate at least a portion of the paper dispensing implement. Additionally, or alternatively, the paper dispensing implement may include a removable paper loader, a sponge, a paper loader lift, and/or a sponge lift. In some examples, the motor may be configured to provide operational power to the paper loader lift and/or the sponge lift. In some examples, the paper loader lift may be configured to raise and/or lower the paper loader. Additionally, or alternatively, the sponge lift may be configured to raise and/or lower the sponge. In some examples, the paper loader may be sized to contain the paper-like material situated in a stack one on top of the other. In some examples, the sponge may contain moisture, such that, when the sponge contacts a portion of the paper like material, the sponge may wet the paper-like material to assist in sealing the paper cone during the shaping process of the paper-like material. For example, the sponge may contact a portion of the paper-like material upon entry to cavity via the slit. When the cone rolling implement begins rotation, the portion of the paper-like material that has been wetted by the sponge may contact a separate portion of the paper-like material, forming a seal of the paper cone.

The support material dispensing implement may be arranged in a number of ways. For example, the support material dispensing implement may be secured to the support frame. Additionally, or alternatively, the support material dispensing implement may have a standalone support frame. Additionally, or alternatively, the support material dispensing implement may include one or more motors configured to actuate at least a portion of the support material dispensing implement. In some examples, the support material dispensing implement may include a cylindrical loader component, a ramp, and/or a piston component. In some examples, the cylindrical loader component may be cylindrical in shape and may be configured to rotate about a longitudinal axis extending from a first end of the cylindrical loader component to a second end opposite the first end. Additionally, or alternatively, the cylindrical loader component may include an exterior surface disposed on the cylindrical shell of cylindrical loader. In some examples, the exterior surface may include one or more depressions sized to receive the support material. In some examples, a face of the cylindrical loader may have radial symmetry, such that the one or more depressions are arranged radially on the face(s) of the cylindrical loader and equidistant from one another. In some examples, the ramp may be arranged such that gravity may cause the support material to roll down the ramp and into the one or more depressions. For example, the ramp may be configured such that the support material may roll down the ramp and into a first depression that is most proximal to the ramp. In some examples, the piston may include a rod configured to push the support material out the first end or the second end of the one or more depressions and into the cavity of the cone shaping implement via the first end or the second end of the cone shaping implement, as described above.

In an example operation, the ramp may be loaded with one or more support materials. The support material(s) may roll down the ramp in a single-file queue manner toward the cylindrical loader. The cylindrical loader may be configured to rotate in increments, such that one of the depressions lines up with the first opening or the second opening of the cone shaping implement and/or one of the depressions is positioned to receive the next support material rolling down the ramp. When the support material enters a depression of the cylindrical loader, the cylindrical loader may rotate an increment and align the depression with the first opening or the second opening of the cone shaping implement. Once in line, the piston may fire the rod, causing the support material to move from the depression to the cavity of the cone shaping implement. This process is repeated, and each increment may align a first depression with the cavity of the cone shaping implement and/or align a second depression to receive the next support material rolling down the ramp.

The securing implement may be arranged in a number of ways. For example, the securing implement may be secured to the support frame. Additionally, or alternatively, the securing implement may have a standalone support frame. Additionally, or alternatively, the securing implement may include a motor configured to actuate at least a portion of the securing implement. In some examples, the securing implement may include a vacuum component. In some examples, the vacuum component may be configured to create suction for the purpose of stabilizing and/or substantially securing the support material in the cavity while the paper-like material is being shaped into the paper cone.

In some examples, the securing implement may be configured to perform various operations. In some examples, the securing implement may be configured to rotate about a longitudinal axis of the vacuum component. Additionally, or alternatively, the securing component may be configured to extend from a retracted state to an extended state and/or retract from the extended state to the retracted state. In some examples, the extending and retracting operations may be performed via an actuator coupled to the securing implement and/or the support frame, such as, for example, an air shuttle. In some examples, the extended state may position the vacuum component in the first portion or the second portion of the cavity of the cone shaping implement. Additionally, or alternatively, once the securing implement is in the extended state, the securing implement may cause the vacuum component to create suction, substantially securing at least the support material in the cavity as the cone rolling implement rotates. Additionally, or alternatively, the securing implement may begin rotation in the extended state to assist in securing the support material in the cavity. Additionally, of alternatively, the retracted state may position the vacuum component outside of the cavity.

The ejector implement may be configured in a number of ways. For example, the ejector implement may be secured to the support frame. Additionally, or alternatively, the ejector implement may have a standalone support frame. Additionally, or alternatively, the ejector implement may have one or more motors configured to actuate at least a portion of the ejector implement. In some examples, the ejector implement may include a vacuum guide tube and/or an ejection component. In some examples, the vacuum guide tube may be positioned to receive the paper cone from the cavity of the cone shaping implement via the first side or the second side of the cone shaping implement. Additionally, or alternatively, the vacuum guide tube may be configured to create suction configured to assist in removing the paper cone from the cavity and/or transport the paper cones from the cone machine to a storage. Additionally, or alternatively, the ejection component may be configured to assist in ejecting the paper cone from the cavity via the first side or the second side of the cone shaping implement, whichever side is opposite from the vacuum guide tube. For example, if the vacuum guide tube is positioned to receive the paper cone from the cavity of the cone shaping implement via the first side, the ejection component may be positioned to assist in ejecting the paper cone from the cavity via the second side of the cone shaping implement. In some examples, the ejection component may be configured as a nozzle for dispensing air against the support implement and to assist in removing the paper cone from the cavity. Additionally, or alternatively, the ejection component may be configured as a piston, firing a rod to contact the support material and to assist in removing the paper cone from the cavity.

The display may have at least one processor and at least one memory. Additionally, or alternatively, the display may be communicably coupled to one or more external computing devices. The memory may have instructions stored thereon causing the processor to perform one or more actions, such as, for example, presenting a Graphical User Interface (GUI) on the display. The GUI may be configured to accept input from a user to cause the cone machine to perform an action, such as, for example, rotate, extend, retract, actuate, and/or cause any of the components described herein to perform an associated desired operation. Additionally, or alternatively, the GUI may be configured to accept input from a user to control the operation task, speed, and/or percentage of available power from the motor, and/or choose from various shaping techniques there within or specify settings to create new shaping techniques. The GUI may also be configured to power on and power off the cone machine. Other actions the cone machine may be able to perform are, for example, safety settings, on/off timer, and timed speed changes to form different paper cone shaping techniques.

The one or more buttons may be configured to cause the cone machine to perform an immediate action upon actuation, without any additional processing. In examples, when a user physical actuates a button, the cone machine may be configured to cease all operation. In examples, the one or more buttons may be configured to perform one or more actions associated with the cone machine.

Take for example, an environment where a user desires to produce a number of paper cones to package processed agricultural material for repurpose use and/or sell as a paper cone that meets the industry standard. The user may load the removable paper loader with a sufficient amount paper-like material of their choosing. The user may load the ramp of the support material dispensing implement with a sufficient amount support material of their choosing. The user may turn on the cone machine by pressing a button and/or actioning the display. The user may select the desired operation settings for the cone machine by touching the GUI elements presented on the display. The user may begin the automated operation of the cone machine by touching a GUI element presented on the display.

As operation begins, a cavity of a cone shaping implement coupled to a transport implement of the actuator may receive a single one of the support material via the support material dispensing implement. The support material dispensing implement may then incrementally rotate, aligning at least one depression of the cylindrical loader component with a cone shaping implement and/or positioning at least one depression of the cylindrical loader component to receive a single one of the support material via the ramp. The actuator may then cause the transport implement to travel in a first direction of travel toward the paper dispensing implement. The cavity of the cone shaping implement may receive at least a portion of a single one of the paper-like material via the slit. The cone rolling implement may extend to the extended state and enter the cavity of the cone shaping implement, causing the edge of the member to protrude beyond the exterior surface of the mandrel and contact the portion of the paper-like material in the cavity. The securing implement may extend to the extended state and enter the cavity from an end of the cone shaping implement that is opposite the cone rolling implement. The securing implement may cause the vacuum component to create suction and stabilize and/or substantially secure the support material. The cone rolling implement may begin to rotate and cause the remaining portion of the paper-like material to enter the cavity. As the paper-like material enters the cavity, the sponge lift may cause the sponge to lower and contact a remaining portion of the paper-like material prior to its entry into the cavity creating a wetted portion of the paper-like material. The cone rolling implement may rotate in the cone shaping implement, causing the wetted portion of the paper-like material to contact a non-wetted portion of the paper-like material and create a seal and form the paper cone. As the cone rolling implement continues to rotate, the wetted portion may substantially dry due to friction. The cone rolling implement ceases rotation, and the securing implement may cause the vacuum component to cease suction. The cone rolling implement may retract from the extended state to the retracted state, and the securing implement may retract from the extended state to the retracted state. The actuator may cause the transport implement to travel in a second direction opposite the first direction toward the ejector implement. The actuator may position the first opening of the cone shaping implement proximal to the vacuum guide tube and the second opening of the cone shaping implement proximal to the ejection component. The ejector implement may cause the vacuum guide tube to create suction. As the suction is occurring, the ejector implement may cause the ejection component to dispense air and/or fire a rod to contact the support material and assist in removing the paper cone from the cavity. The paper cone exits the cavity of the cone shaping implement via the first opening and travels through the vacuum guide tube leading to a paper cone storage of the users' choice. The process may be automatically repeated a number of times specified by the user and/or until the supply of the paper-like material and/or the support material is empty. The process described above may be performed more than once per travel by the actuator, simultaneously shaping the paper-like material around the support material and creating multiple paper cones.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example automated paper cone shaping and arrangement machine system (hereinafter, "the cone system") 100. The cone system 100 may include a cone machine 102, one or more of a paper-like material 104(*a*), and/or one or more support material 106(*a*). The cone system may be configured to utilize the cone machine 102 and shape the paper-like material 104(*a*) into a paper cone 108 having a shape, size, and/or components that are desired and/or have been made a standard for repackaging agricultural material for repurpose use. In some examples, the shape of the paper cone 108 may be substantially conical. In some examples, the paper-like material 104 may be comprised of at least one of refined white paper, unrefined brown paper, recycled paper, hemp paper, palm leaf, and/or anything containing substantially similar qualities. In some examples, the paper cone may include a support material disposed therein 106(*b*). In some examples, the support material 106 may be substantially cylindrical and/or conical in shape. In some examples, the support material 106 may have a more favorable rigidity than the paper-like material 104 used to shape the paper cone 108, such that the support material 106 provides substantial support for at least a portion of the paper cone 108. In some examples, the support material 106 may be comprised of at least one of refined white paper, unrefined brown paper, recycled paper, hemp paper, palm leaf, and/or anything containing substantially similar qualities. Additionally, or alternatively, the support material 106 may be configured to obstruct the processed agricultural material while allowing for air to pass therethrough.

The cone machine 102 may include a support frame 110. The support frame 110 may provide support for the one or more components/implements of the cone machine 102. The support frame 110 may be configured such that the components may be arranged in various manners, such that the cone machine 102 may utilize various shaping techniques, such as, for example, multiple shaping operations executing simultaneously, shaping of paper cones having various sizes, and/or shaping operations executing at various speeds. In some examples, the support frame 110 may be connected across the entirety of the cone machine 102. Additionally, or alternatively, each individual component of the cone machine 102 may have an standalone support frame 110. The support frame 110 may be configured to support one or more motors for providing operational power to one or more components of the cone machine 102. In some examples, the one or more motors may be coupled to an individual component. Additionally, or alternatively, the cone machine 102 may utilize one motor for providing operational power to the components included therein. The one or more motors may be configured such that a user may specify a speed, such as, for example, a percentage of available power from the motor at which the motor will operate. In some examples, the motor may be configured to operate at any value from 0 to 100 percent of the available power from the motor, where 0 percent may be the lowest available power from the motor and 100 percent may be the highest available power from the motor. The motor may be configured such that it provides operational power to a number of components of the cone machine at the speed specified by the user.

The cone machine 102 may include an actuator 112 that may be arranged in a number of ways. For example, the actuator 112 may be secured to the support frame 110. Additionally, or alternatively, the actuator 112 may have a standalone support frame 110. In some examples, the actuator 112 may be configured to include a first end and a second end being opposite the first end. The actuator 112 may further be configured to travel in at least a first direction of travel and a second direction of travel. In some examples, the actuator 112 may be configured using various techniques, such as, for example, as a ball screw having a first end attached to a drive bearing and a second end being opposite the first end and attached to a support bearing. Additionally, or alternatively, the ball screw may comprise a linear motion bearing threaded onto the ball screw and configured to travel between the first end and the second end as the ball screw rotates. In some examples, the actuator 112 may be configured as a pulley, a belt, and/or any other means having a two-way linear direction of travel. In some examples, the actuator 112 may include a transport implement 114 coupled thereto. As an example, an actuator 112 implemented as a ball screw may have the transport implement 114 coupled thereto the linear motion bearing such that the transport implement 114 may travel between ends of the actuator along with the linear motion bearing. Additionally, or alternatively, the transport implement 114 may provide support for one or more additional components, such as, for example, one or more cone shaping implements 116. Additionally, or alternatively, the actuator 112 may be configured to rotate about its longitudinal axis, such that, the actuator 112 may be able to facilitate various arrangements of the cone machine 102. For example, the cone machine 102 may be arranged such that some components may be positioned above the actuator 112 and/or some components may be positioned below the actuator 112, and the actuator 112 may travel in the first and/or second direction(s) of travel between the first end and the second end and/or may rotate such that components coupled to transport implements 114 disposed on a top side of the actuator 112 may access components that are positioned on a bottom side of the actuator 112, for example.

The cone machine 102 may include a cone shaping implement 116 that may be arranged in a number of ways. For example, the cone shaping implement 116 may be coupled to a transport implement 116. Additionally, or alternatively, the cone shaping implement 116 may be secured to the support frame 110. Additionally, or alternatively, the cone shaping implement 116 may have a standalone support frame 110. The cone shaping implement 116 may have a cavity extending between a first opening and a second opening along a longitudinal axis of the cone shaping implement 116, the cavity being sized to shape the paper-like material 104 into the paper cone 108. Additionally, or alternatively, the cone shaping implement 116 may have an exterior surface. Additionally, or alternatively, the cone shaping implement 116 may have a slit extending from the exterior surface to the cavity.

The cone machine 102 may include a cone rolling implement 118 that may be arranged in a number of ways. For example, the cone rolling implement 118 may be secured to the support frame 110. Additionally, or alternatively, the cone rolling implement 118 may have a standalone support frame 110. Additionally, or alternatively, the cone rolling implement 118 may include the one or more motors configured to actuate at least a portion of the cone rolling implement 118. Additionally, or alternatively, the cone rolling implement 118 may have a shaft component, a mandrel component, a member attached to the shaft, and/or a spring. The member may have an edge that may be positioned substantially even with the exterior surface of the mandrel component and/or may be configured to protrude past the exterior surface. In some examples, the edge may be comprised of a material configured to have a level of friction greater than that of an exterior surface of the mandrel component. For example, the edge may be comprised of a rubber material, a silicon material, a nitrile material, a neoprene material, a vinyl material, or any other material having a friction that is greater than that of the exterior surface of the mandrel component.

In some examples, the cone rolling implement 118 may be configured to perform various operations. In some examples, the cone rolling implement 118 may be configured to rotate about a longitudinal axis of the shaft and/or mandrel. Additionally, or alternatively, the cone rolling implement 118 may be configured to extend from a retracted state to an extended state and/or retract from the extended state to the retracted state. In some examples, the extending and retracting operations may be performed via an actuator coupled to the cone rolling implement 118 and/or the support frame 110, such as, for example, an air shuttle. In some examples, the extended state may position the mandrel in the cavity of the cone shaping implement 116. Additionally, or alternatively, once the mandrel has been positioned in the cavity, the shaft may compress the spring, causing the member to slide in the channel of the mandrel and causing the edge of the member to protrude beyond the exterior surface of the mandrel. In some examples, the retracted state may position the mandrel component outside of the cavity and/or decompress the spring.

The cone machine 102 may include a paper dispensing implement 120 that may be arranged in a number of ways. For example, the paper dispensing implement 120 may be secured to the support frame 110. Additionally, or alternatively, the paper dispensing implement 120 may have a standalone support frame 110. Additionally, or alternatively, the paper dispensing implement 120 may include at least one of the motors configured to actuate at least a portion of the paper dispensing implement 120. Additionally, or alternatively, the paper dispensing implement 120 may include a removable paper loader, a sponge, a paper loader lift, and/or a sponge lift. In some examples, the motor may be configured to provide operational power to the paper loader lift and/or the sponge lift. In some examples, the paper loader lift may be configured to raise and/or lower the paper loader. Additionally, or alternatively, the sponge lift may be configured to raise and/or lower the sponge. In some examples, the paper loader may be sized to contain the paper-like material 104(*a*) situated in a stack one on top of the other. In some examples, the sponge may contain moisture, such that, when the sponge contacts a portion of the paper like material 104, the sponge may wet the paper-like material 104 to assist in sealing the paper cone 108 during the shaping process of the paper-like material 104. For example, the sponge may contact a portion of the paper-like material 104 upon entry to cavity via the slit. When the cone rolling implement 118 begins rotation, the portion of the paper-like material 104 that has been wetted by the sponge may contact a separate portion of the paper-like material 104, forming a seal of the paper cone.

The cone machine 102 may include a support material dispensing implement 122 that may be arranged in a number of ways. For example, the support material dispensing implement 122 may be secured to the support frame 110. Additionally, or alternatively, the support material dispensing implement 122 may have a standalone support frame 110. Additionally, or alternatively, the support material dispensing implement 122 may include at least one motor configured to actuate at least a portion of the support material dispensing implement 122. In some examples, the support material dispensing implement 122 may include a cylindrical loader component, a ramp, and/or a piston component. In some examples, the cylindrical loader component may be cylindrical in shape and may be configured to rotate about a longitudinal axis extending from a first end of the cylindrical loader component to a second end opposite the first end. Additionally, or alternatively, the cylindrical loader component may include an exterior surface disposed on the cylindrical shell of cylindrical loader. In some examples, the exterior surface may include one or more depressions sized to receive the support material 106(*a*). In some examples, a face of the cylindrical loader may have radial symmetry, such that the one or more depressions are arranged radially on the face(s) of the cylindrical loader and equidistant from one another. In some examples, the ramp may be arranged such that gravity may cause the support material 106(*a*) to roll down the ramp and into the one or more depressions. In some examples, the piston may include a rod configured to push the support material 106(*a*) out the first side or the second side of the one or more depressions and into the cavity of the cone shaping implement 116 via the first side or the second side of the cone shaping implement 116, as described above.

In an example operation, the ramp may be loaded with one or more support materials 106(*a*). The support material(s) 106(*a*) may roll down the ramp in a single-file queue manner toward the cylindrical loader. The cylindrical loader may be configured to rotate in increments, such that one of the depressions lines up with the first opening or the second opening of the cone shaping implement 116 and/or one of the depressions is positioned to receive the next support material rolling down the ramp. When the support material 106(*a*) enters a depression of the cylindrical loader, the cylindrical loader may rotate an increment and align the depression with the first opening or the second opening of the cone shaping implement 116. Once in line, the piston may fire the rod, causing the support material 106(*a*) to move from the depression to the cavity of the cone shaping implement 116. This process is repeated, and each increment may align a first depression with the cavity of the cone shaping implement 116 and/or align a second depression to receive the next support material 106(*a*) rolling down the ramp.

The cone machine 102 may include a securing implement 124 that may be arranged in a number of ways. For example, the securing implement 124 may be secured to the support frame 110. Additionally, or alternatively, the securing implement 124 may have a standalone support frame 110. Additionally, or alternatively, the securing implement may include at least on motor configured to actuate at least a portion of the securing implement 124. In some examples, the securing implement 124 may include a vacuum component 126. In some examples, the vacuum component 126 may be configured to create suction for the purpose of stabilizing and/or substantially securing the support material 106(*a*) in the cavity while the paper-like material 104(*a*) is being shaped into the paper cone 108.

In some examples, the securing implement 124 may be configured to perform various operations. In some examples, the securing implement 124 may be configured to rotate about a longitudinal axis of the vacuum component 126. Additionally, or alternatively, the securing component 124 may be configured to extend from a retracted state to an extended state and/or retract from the extended state to the retracted state. In some examples, the extending and retracting operations may be performed via an actuator 128 coupled to the securing implement and/or the support frame, such as, for example, an air shuttle. In some examples, the extended state may position the vacuum component 126 in the cavity of the cone shaping implement 116. Additionally, or alternatively, once the securing implement 124 is in the extended state, the securing implement 124 may cause the vacuum component 126 to create suction, substantially securing at least the support material 106(*a*) in the cavity as the cone rolling implement rotates. Additionally, or alternatively, the securing implement 124 may begin rotation in the extended state to assist in securing the support material 106 in the cavity. Additionally, of alternatively, the retracted state may position the vacuum component 126 outside of the cavity.

The cone machine 102 may include an ejector implement 130 that may be arranged in a number of ways. For example, the ejector implement 130 may be secured to the support frame 110. Additionally, or alternatively, the ejector implement 130 may have a standalone support frame 110. Additionally, or alternatively, the ejector implement 130 may have at least one of the motor(s) configured to actuate at least a portion of the ejector implement 130. In some examples, the ejector implement 130 may include a vacuum guide tube and/or an ejection component. In some examples, the vacuum guide tube may be positioned to receive the paper cone 108 from the cavity of the cone shaping implement 116 via the first end or the second end of the cone shaping implement 116. Additionally, or alternatively, the vacuum guide tube may be configured to create suction configured to assist in removing the paper cone 108 from the cavity and/or transport the paper cones 108 from the cone machine 102 to a storage. Additionally, or alternatively, the ejection component may be configured to assist in ejecting the paper cone from the cavity via the first end or the second end of the cone shaping implement 116, whichever end is opposite from the vacuum guide tube. For example, if the vacuum guide tube is positioned to receive the paper cone 108 from the cavity of the cone shaping implement 116 via the first end, the ejection component may be positioned to assist in ejecting the paper cone 108 from the cavity via the second end of the cone shaping implement 116. In some examples, the ejection component may be configured as a nozzle for dispensing air against the support implement 106(*b*) and to assist in removing the paper cone 108 from the cavity. Additionally, or alternatively, the ejection component may be configured as a piston, firing a rod to contact the support material 106(*b*) and to assist in removing the paper cone 108 from the cavity.

The cone machine 102 may include a display 132 that may be arranged in a number of ways. In some examples, the display 132 may be attached to the support frame 110 and coupled via a wired connection to the cone machine 102. Additionally, or alternatively, the display 132 may be configured as a standalone display 132 that is wirelessly connected to the cone machine 102. The display 132 may have at least one processor 134 and at least one memory 136. Additionally, or alternatively, the display 132 may be communicably coupled to one or more external computing devices, having one or more processors 134 and at least one memory 136, in association with the cone machine 102. The memory 136 may have instructions stored thereon causing the processor(s) 134 to perform one or more actions, such as, for example, presenting a Graphical User Interface (GUI) on the display 132. The display 132 may comprise a touch interface 138 configured to accept touch input from a user. The GUI may be associated with the touch interface 138 configured to accept input from a user to cause the cone machine 102 to perform an action, such as, for example, rotate, extend, retract, actuate, and/or cause any of the components described herein to perform an associated desired operation. Additionally, or alternatively, the GUI may be configured to accept input from a user to control the operation task, speed, and/or percentage of available power from the motor, and/or choose from various shaping techniques there within or specify settings to create new shaping techniques. The GUI may also be configured to power on and power off the cone machine 102. Other actions the cone machine may be able to perform are, for example, safety settings, on/off timer, and timed speed changes to form different paper cone 108 shaping techniques.

The cone machine 102 may include one or more buttons 140 that may be arranged in a number of ways. The button(s) 140 may be arranged throughout the cone machine 102, and coupled to the support frame 110. The button(s) 140 may be configured to cause the cone machine 102 to perform an immediate action upon actuation, without any additional processing. In examples, when a user physical actuates a button, the cone machine may be configured to cease all operation. In examples, the one or more buttons 140 may be configured to perform one or more actions associated with the cone machine 102.

Take for example, an environment where a user desires to produce a number of paper cones 108 to package processed agricultural material for repurpose use and/or sell as a paper cone 108 that meets the industry standard. The user may load a removable paper loader with a sufficient amount paper-like material 104(*a*) of their choosing. The user may load the ramp of the support material dispensing implement 122 with a sufficient amount support material 104(*a*) of their choosing. The user may turn on the cone machine 102 by pressing a button 140 and/or actioning the display 132. The user may select the desired operation settings for the cone machine 102 by touching the GUI elements presented on the display 132. The user may begin the automated operation of the cone machine 102 by touching a GUI element presented on the display 132.

As operation begins, a cavity of a cone shaping implement 116 coupled to a transport implement 114 of the actuator 112 may receive a single one of the support material 104 via the support material dispensing implement 122. The support material dispensing implement 122 may then incrementally rotate, aligning at least one depression of the cylindrical loader component with a cone shaping implement 116 and/or positioning at least one depression of the cylindrical loader component to receive a single one of the support material 104(*a*) via the ramp. The actuator 112 may then cause the transport implement 114 to travel in a first direction of travel toward the paper dispensing implement 120. The cavity of the cone shaping implement 116 may receive at least a portion of a single one of the paper-like material 104(*a*) via the slit. The cone rolling implement 118 may extend to the extended state and enter the cavity of the cone shaping implement 116, causing the edge of the member to protrude beyond the exterior surface of the mandrel and contact the portion of the paper-like material 104(*a*) in the cavity. The securing implement 124 may extend to the extended state and enter the cavity from an end of the cone shaping implement 116 that is opposite the cone rolling implement 118. The securing implement 124 may cause the vacuum component 126 to create suction and stabilize and/or substantially secure the support material 106(*a*). The cone rolling implement 118 may begin to rotate and cause the remaining portion of the paper-like material 104(*a*) to enter the cavity. As the paper-like material 104(*a*) enters the cavity, the sponge lift may cause the sponge to lower and contact a remaining portion of the paper-like material 104(*a*) prior to its entry into the cavity creating a wetted portion of the paper-like material 104(*a*). The cone rolling implement 118 may rotate in the cone shaping implement 116, causing the wetted portion of the paper-like material 104 to contact anon-wetted portion of the paper-like material 104 and create a seal and form the paper cone 108. As the cone rolling implement 118 continues to rotate, the wetted portion may substantially dry due to friction. The cone rolling implement 118 may cease rotation, and the securing implement 124 may cause the vacuum component 126 to cease suction. The cone rolling implement 118 may retract from the extended state to the retracted state, and the securing implement 124 may retract from the extended state to the retracted state. The actuator 112 may cause the transport implement 114 to travel in a second direction opposite the first direction toward the ejector implement 130. The actuator 112 may position the first opening of the cone shaping implement 116 proximal to the vacuum guide tube and the second opening of the cone shaping implement 116 proximal to the ejection component. The ejector implement 130 may cause the vacuum guide tube to create suction. As the suction is occurring, the ejector implement 130 may cause the ejection component to dispense air and/or fire a rod to contact the support material 106(*b*) and assist in removing the paper cone 108 from the cavity. The paper cone 108 exits the cavity of the cone shaping implement 116 via the first opening and travels through the vacuum guide tube leading to a paper cone 108 storage of the users' choice.

The process may be automatically repeated a number of times specified by the user and/or until the supply of the paper-like material 104(*a*) and/or the support material 106(*a*) is empty. The process described above may be performed more than once per travel by the actuator, simultaneously shaping the paper-like material 104 around the support material 106 and creating multiple paper cones 108.

Figure 2A:
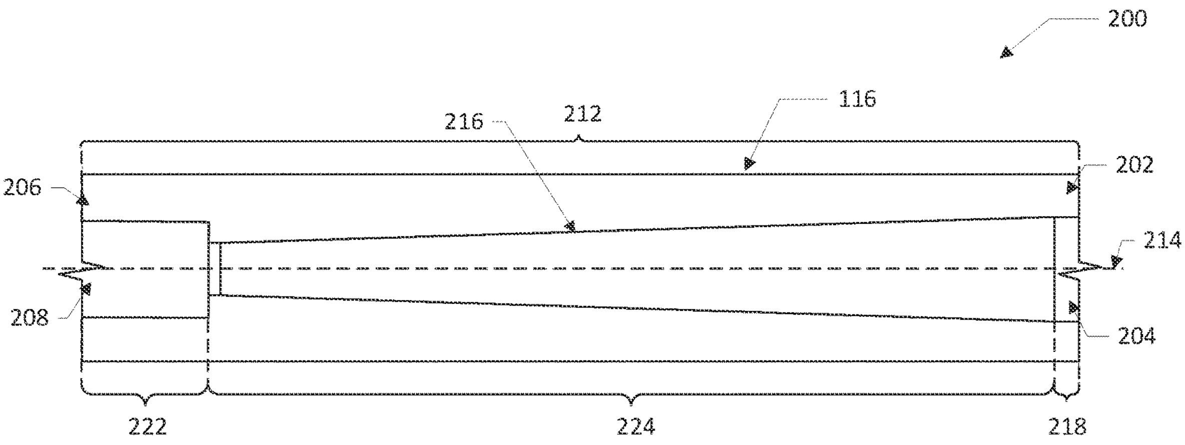
FIG. 2A illustrates a schematic cross-section diagram of an example cone shaping implement from a first perspective.
Figure 2B:
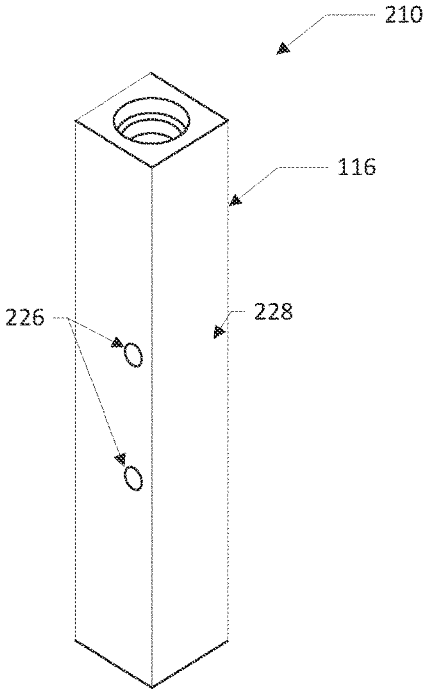
FIG. 2B illustrates a schematic diagram of an example cone shaping implement from a second perspective.
Figure 2C:
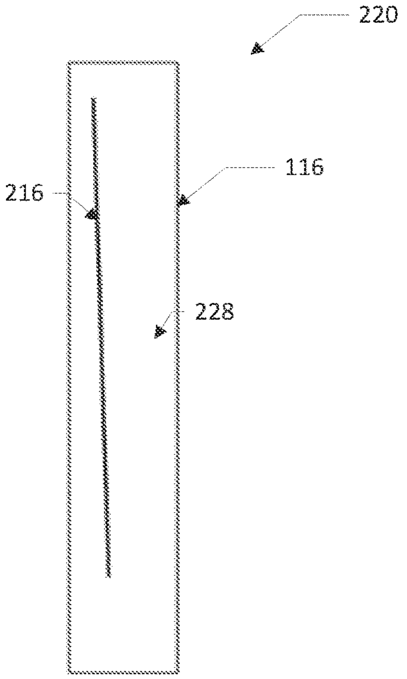
FIG. 2C illustrates a schematic diagram of an example cone shaping implement from a third perspective.

FIGS. 2A-2C illustrate schematic diagrams of an example cone shaping implement 116 from a first perspective 200, a second perspective 210, and a third perspective 220, respectively. The cone shaping implement 116 may include the same or similar components and/or attributes of the cone shaping implement 116 from FIG. 1. The perspectives are included for the sake of clarity and are not intended to be limiting in any manner.

FIG. 2A illustrates a schematic cross-section diagram of an example cone shaping implement 116 from a first perspective 200. The cone shaping implement 116 may be arranged in a number of ways. In some examples, the cone shaping implement 116 may have a first end 202 with a first opening 204 having a first diameter. Additionally, or alternatively, the cone shaping implement 116 may have a second end 206 with a second opening 208 having the first diameter. Additionally, or alternatively, the cone shaping implement may have a cavity 212 extending between the first opening 204 and the second opening 208 along a longitudinal axis 214 of the cone shaping implement 116. Additionally, or alternatively, the cone shaping implement 116 may have an exterior surface. Additionally, or alternatively, the cone shaping implement may have a slit 216 extending from the exterior surface to the cavity 212. In some examples, the cavity 212 may be defined by various portions. For example, the cavity 212 may include a first portion 218 that extends a first length along the longitudinal axis 214 from the first opening 204. In some examples, the first portion 218 may be cylindrical in shape and/or may have the first diameter. Additionally, or alternatively, the cavity 212 may include a second portion 218 that extends a second length along the longitudinal axis 214 from the second opening 208. In some examples, the second portion 222 may be cylindrical in shape, have the first diameter, and/or extend a second length that is greater than the first length. Additionally, or alternatively, the cavity 212 may include a third portion 224 connecting the first portion 218 and the second portion 222. In some examples, the third portion 224 may taper from the first portion 218 to the second portion 222 along the longitudinal axis of the cone shaping implement 116 and from the first diameter to a second diameter that is less than the first diameter. In some examples, the third portion 224 may be a third length that is greater than the second length and/or the third length. In some examples, the slit 216 may be sized the third length and aligned with the third portion 224. Additionally, or alternatively, the slit 216 may be sized to receive the paper-like material 104.

In some examples, the cone shaping implement 116 may be configured to receive and/or shape the paper-like material 104 into the paper cone 108. In some examples, the cone shaping implement 116 may be configured to receive the paper-like material 104 via the slit 216. For example, the paper-like material 104 may be dispensed in a manner such that the paper-like material 104 enters the cavity 212 of the cone shaping implement 210 via the slit 216, and may wrap around the cavity 212 of the cone shaping implement 116, causing the paper-like material 104 to take the conical shape of the paper cone 108. Additionally, or alternatively, the cone shaping implement 116 may be configured to receive the support material 106 via the first opening 204 and/or the second opening 208. In some examples, the paper-like material 104 may form the paper cone 108 wrapping around encapsulating the support material 106. Additionally, or alternatively, the cavity 212 of the cone shaping implement 116 may be sized to receive a cone rolling implement 118, such that, the cone shaping implement 118, the cone rolling implement 116, and/or any other components/implements described herein may be utilized in any combination to shape the paper-like material 104 into the paper cone 108. For example, the first opening 204 may be sized to receive at least a portion of the cone rolling implement 118. Additionally, or alternatively, the second opening may be sized to receive at least a portion of a securing implement 124, such that, the cone shaping implement 116, the securing implement 124, and/or any other components/implements described herein may be utilized in any combination to shape the paper-like material 104 into the paper cone 108.

FIG. 2B illustrates a schematic diagram of an example cone shaping implement 116 from a second perspective 210. In some examples, the cone shaping implement 116 may include one or more holes 226 for securing the shaping implement 116 to a transport implement 114. As mentioned above with respect to FIG. 2A, the cone shaping implement 116 may include an exterior surface 228. Additionally, or alternatively, the cone shaping implement may have a slit 216 extending from the exterior surface to the cavity 212.

FIG. 2C illustrates a schematic diagram of an example cone shaping implement 116 from a third perspective 220. As mentioned above with respect to FIGS. 2A and 2B, the cone shaping implement 116 may include an exterior surface 228. Additionally, or alternatively, the cone shaping implement may have a slit 216 extending from the exterior surface to the cavity 212.

Figure 3A:
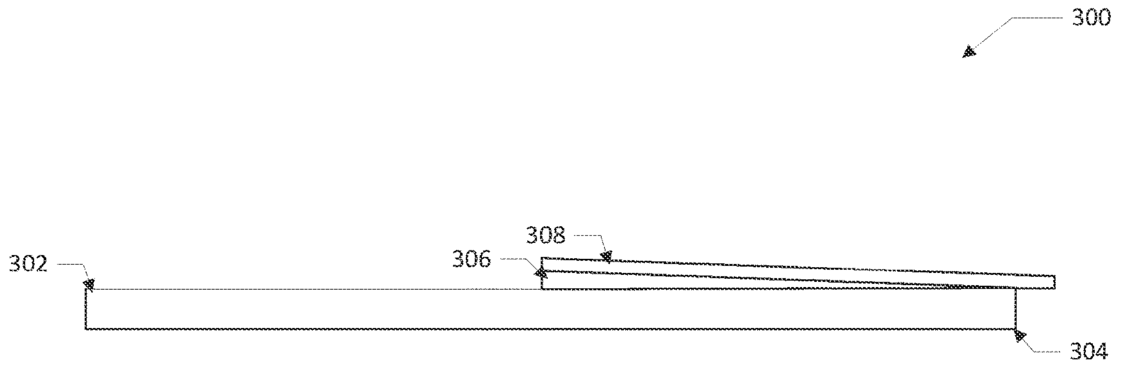
FIG. 3A illustrates a schematic diagram of an example shaft component of a cone rolling implement.
Figure 3B:
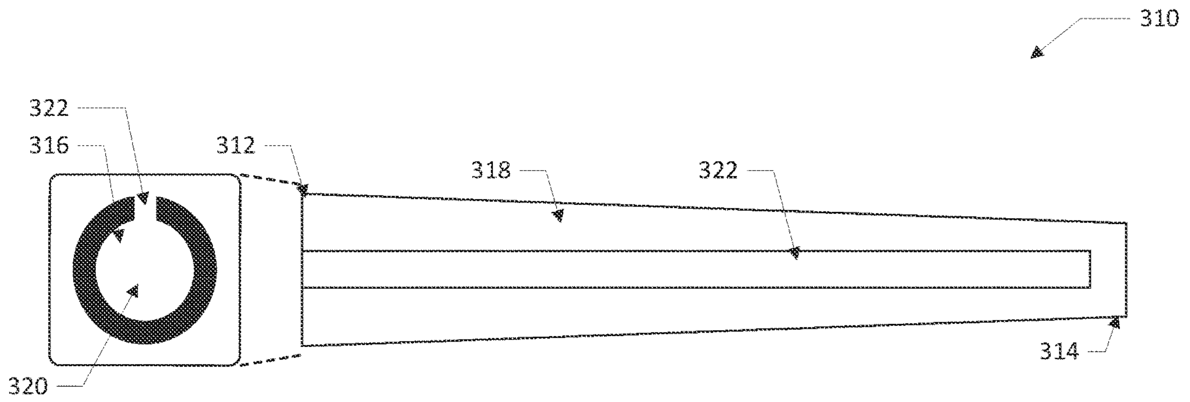
FIG. 3B illustrates a schematic diagram of an example mandrel component of a cone rolling implement.
Figure 3C:
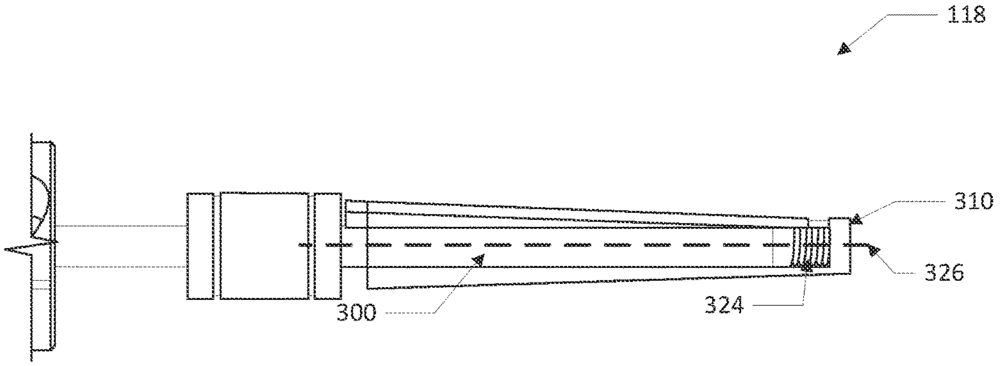
FIG. 3C illustrates a schematic diagram of an example cone rolling implement.

FIGS. 3A-3C illustrate schematic diagrams of an example cone rolling implement 118 and/or components of an example cone rolling implement 118. The cone rolling implement 118 may include the same or similar components and/or attributes of the cone shaping implement 118 from FIG. 1.

FIG. 3A illustrates a schematic diagram of an example shaft component 300 of a cone rolling implement 116. In some examples, the shaft 300 may have a proximal end 302 and a distal end 304. In some examples, the shaft may be sized to be inserted into a receptacle of a mandrel component 310. In some examples, the shaft 300 may have a member 306 disposed thereon. In some examples, the member 306 may have an edge 308 that may be sized to be positioned in a channel of a mandrel component 310 and/or to be substantially even with an exterior surface of a mandrel component 310 and/or may be configured to protrude past the exterior surface of the mandrel component 310. In some examples, the edge 308 may extend beyond the distal end 304 and/or the proximal end 302 of the shaft 300. In some examples, the edge 308 may be comprised of a material configured to have a level of friction greater than that of the exterior surface of the mandrel component 310. For example, the edge 308 may be comprised of a rubber material, a silicon material, a nitrile material, a neoprene material, a vinyl material, or any other material having a friction that is greater than that of the exterior surface of the mandrel component 310.

FIG. 3B illustrates a schematic diagram of an example mandrel component 310 of a cone rolling implement 116. In some examples, mandrel component 310 may be sized such that it may be inserted into a cavity 212 of the cone shaping implement 116, as described with respect to FIGS. 1 and 2A-2C. In some examples, the mandrel component 310 may be of a first length that is substantially similar to the length of the third portion 224 of the cone shaping implement 116, as described with respect to FIGS. 1 and 2A-2C. In some examples, the mandrel component 310 may be coupled to the shaft 300 in such a manner that the mandrel component 310 need not be fixed to the shaft 300. The mandrel component 310 may have a proximal end 312 having a first diameter that is substantially equal to the first diameter of the third portion 224 of the cavity 212 of the cone shaping implement 116, as described with respect to FIGS. 1 and 2A-2C. Additionally, or alternatively, the mandrel component 310 may have a distal end 314 having a second diameter that is substantially equal to the second diameter of the third portion 224 of the cavity 212 of the cone shaping implement 116, as described with respect to FIGS. 1 and 2A-2C. In some examples, the mandrel component 310 may have an opening 316 disposed on the proximal end 312. Additionally, or alternatively, the mandrel component 310 may have an exterior surface 318. Additionally, or alternatively, the mandrel component 310 may have a receptacle 320 extending from the opening 316 a second length that is less than the first length and sized to receive the shaft 300. Additionally, or alternatively, the mandrel component 310 may have a channel 322 extending between the exterior surface 318 and the receptacle 320. In some examples, the channel 322 may be sized such that the member 306 attached to the shaft 300 may be positioned in the channel 322.

FIG. 3C illustrates a schematic diagram of an example cone rolling implement 118. The cone rolling implement 118 may include the same or similar components and/or attributes of the cone shaping implement 118 and/or components of a cone shaping implement 118 from FIGS. 1 and 3A-3B. In some examples, a spring 324 may be disposed in the receptacle 320 between the distal end 304 of the shaft 300 and the distal end 314 of the mandrel component 310. In some examples, the cone rolling implement 118 may be configured to perform various operations. In some examples, the cone rolling implement 118 may be configured to rotate about a longitudinal axis 326 of the shaft 300 and/or mandrel 310.

Figures 4A, 4B, 4C:
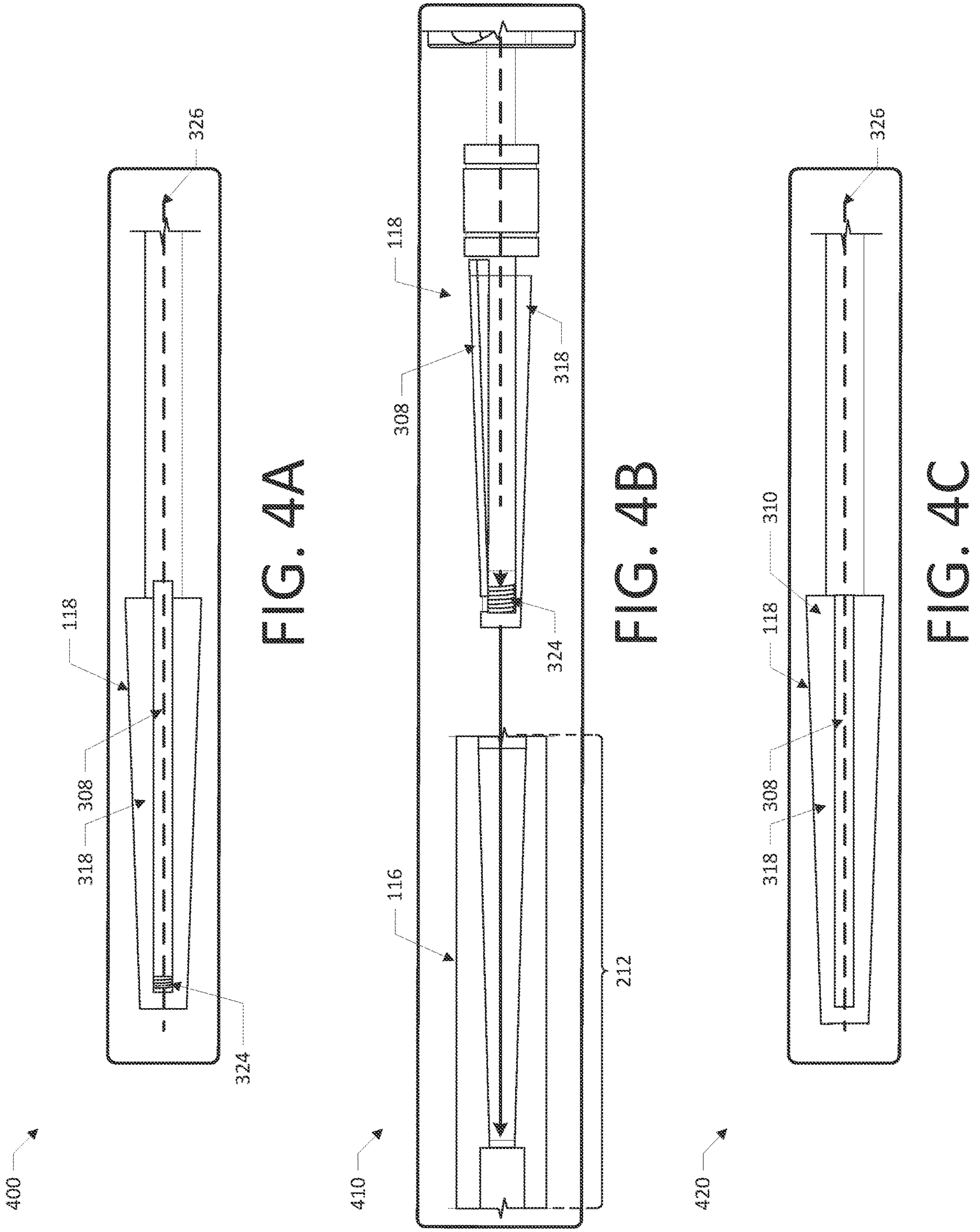
FIG. 4A illustrates a schematic diagram of an example cone rolling implement in a retracted state.
FIG. 4B illustrates a schematic diagram of an example cone rolling implement transitioning from a retracted state to an extended state.
FIG. 4C illustrates a schematic diagram of an example cone rolling implement in an extended state.

FIGS. 4A-4C illustrate schematic diagrams of an example cone rolling implement 118 transitioning from a retracted state 400 to an extended state 420. The cone rolling implement 118 may include the same or similar components and/or attributes of the cone shaping implement 118 and/or components of a cone shaping implement 118 from FIGS. 1 and 3A-3C. In some examples, the cone rolling implement 118 may be configured to extend from a retracted state 400 to an extended state 420 and/or retract from the extended state 420 to the retracted state 400. In some examples, the extending and retracting operations may be performed via an actuator coupled to the cone rolling implement 118 and/or the support frame 110, such as, for example, an air shuttle. The states are included for the sake of clarity and are not intended to be limiting in any manner.

In an example operation, the air shuttle may extend the cone rolling implement 118 from the retracted state 400 to the extended state 420 such that the mandrel 310 is positioned in cavity 212 of the cone shaping implement 116. As the mandrel 310 makes contact with an inside of the cavity 212, the spring 324 may begin to compress causing the edge 308 of the member 306 to protrude beyond the exterior surface 318 of the mandrel 310. The edge 308 of the member 306 may protrude beyond the exterior surface 318 of the mandrel 310 and may contact at least a portion of the paper-like material 104 disposed in the cavity 212. The cone rolling implement 118 may begin rotation to shape the paper-like material 104 into the paper cone 108. Additionally, or alternatively, the cone rolling implement 118 may begin rotation such that the edge 308 of the member 306 may assist in feeding the paper-like material 104 through the slit 216 of the cone shaping implement 116 and into the cavity 212. Additionally, or alternatively, the cone rolling implement 118 may cease rotation, and the air shuttle may begin retracting the cone rolling implement 118 from the extended state 420 to the retracted state 400. The spring 324 begins decompressing, causing the edge 308 of the member 306 to regress back to a substantially even position with the exterior surface 318 of the mandrel 310, where the edge 308 may no longer contact the paper like material 104 and allow for removal of the cone rolling implement 118 without damaging or removing the paper cone 108.

FIG. 4A illustrates a schematic diagram of an example cone rolling implement 118 in a retracted state 400. In some examples, the retracted state 400 may position the mandrel component 310 outside of the cavity 212 and/or decompress the spring 324, causing the member 306 to slide in the channel 322 of the mandrel 310 and causing the edge 308 of the member 306 to rest substantially level with the exterior surface 318 of the mandrel 310.

FIG. 4B illustrates a schematic diagram of an example cone rolling implement 118 in an intermediate state 410 while transitioning from a retracted state 400 to an extended state 420. The intermediate state 410 may position the shaft 300 in the mandrel 310 at any point between the retracted state 400 and the extended state 420.

FIG. 4C illustrates a schematic diagram of an example cone rolling implement in an extended state 420. In some examples, the extended state 420 may position the mandrel 310 in the cavity 212 of the cone shaping implement 116. Additionally, or alternatively, once the mandrel 310 has been positioned in the cavity 212 in the extended state 420, the shaft 300 may compress the spring 324, causing the member 306 to slide in the channel 322 of the mandrel 310 and causing the edge 308 of the member 306 to protrude beyond the exterior surface 318 of the mandrel 310.

Figure 5A:
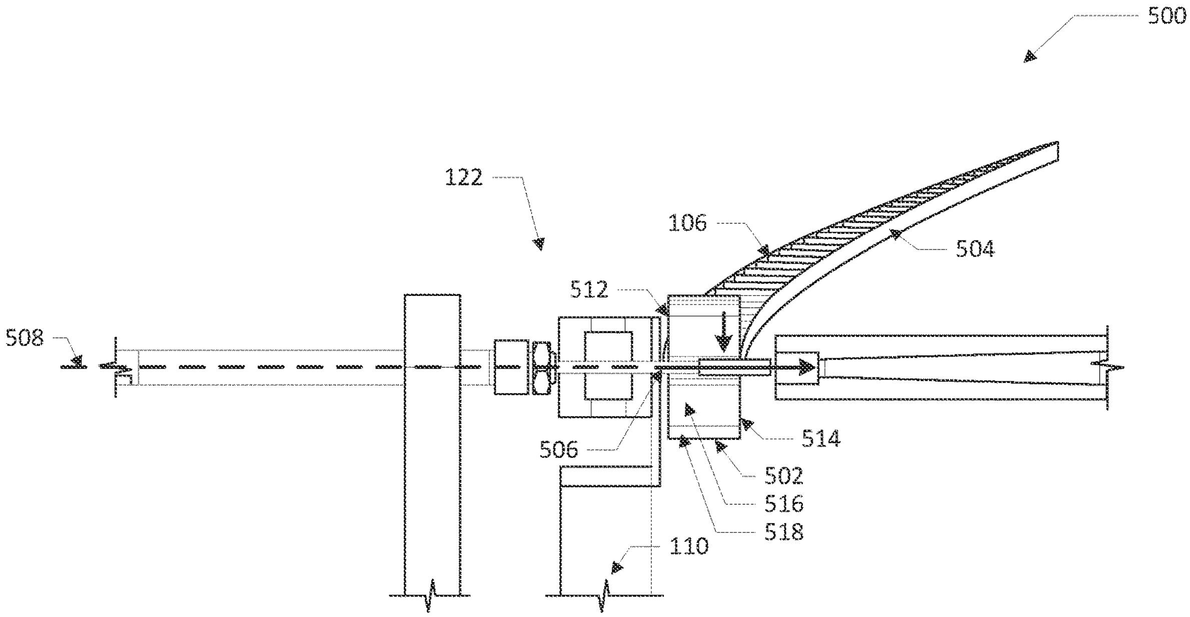
FIG. 5A illustrates a schematic diagram of an example support material loader from a first perspective.
Figure 5B:
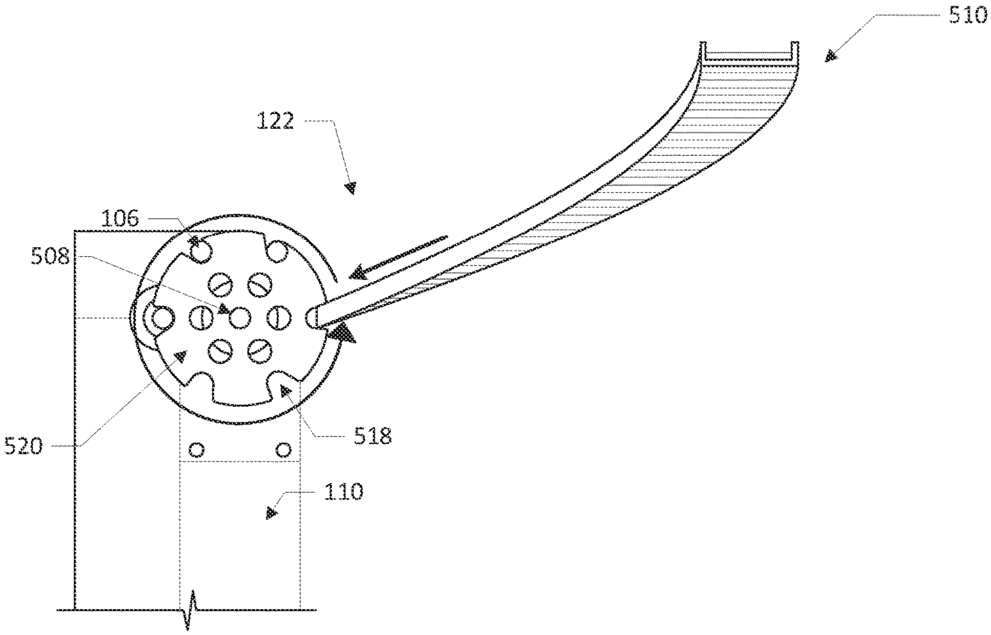
FIG. 5B illustrates a schematic diagram of an example support material loader from a second perspective.

FIGS. 5A and 5B illustrate schematic diagrams of an example support material dispensing implement 122 from a first perspective 500 and a second perspective 510, respectively. The cone support material dispensing implement 122 may include the same or similar components and/or attributes of the support material dispensing implement 122 from FIG. 1. The support material dispensing implement 122 may be arranged in a number of ways. For example, the support material dispensing implement 122 may be secured to the support frame 110. Additionally, or alternatively, the support material dispensing implement 122 may have a standalone support frame 110. Additionally, or alternatively, the support material dispensing implement 122 may include one or more motors configured to actuate at least a portion of the support material dispensing implement 122. The perspectives are included for the sake of clarity and are not intended to be limiting in any manner.

FIG. 5A illustrates a schematic diagram of an example support material loader 122 from a first perspective 500. In some examples, the support material dispensing implement may include a cylindrical loader component 502, a ramp 504, and/or a piston component 506. In some examples, the cylindrical loader component 502 may be cylindrical in shape and may be configured to rotate about a longitudinal axis 508 extending from a first end 512 of the cylindrical loader component to a second end 514 opposite the first end. Additionally, or alternatively, the cylindrical loader component 502 may include an exterior surface 516 disposed on the cylindrical shell of cylindrical loader 502. In some examples, the exterior surface 516 may include one or more depressions 518 sized to receive the support material 104. In some examples, the ramp 504 may be arranged such that gravity may cause the support material 104 to roll down the ramp 504 and into the one or more depressions 518. For example, the ramp 504 may be configured such that the support material 104 may roll down the ramp 504 and into a first depression 518 that is most proximal to the ramp 504. In some examples, the piston 506 may include a rod configured to push the support material 104 out of the second end 514 of the one or more depressions 518 and into the cavity 212 of the cone shaping implement 116 via the first end 512 or the second end 514 of the cone shaping implement 116.

FIG. 5B illustrates a schematic diagram of an example support material loader 122 from a second perspective 500. As mentioned previously, the support material dispensing implement may include a cylindrical loader component 502, a ramp 504, and/or a piston component 506. In some examples, the cylindrical loader component 502 may be cylindrical in shape and may be configured to rotate about a longitudinal axis 508 extending from a first end 512 of the cylindrical loader component to a second end 514 opposite the first end. In some examples, a face 520 of the cylindrical loader may have radial symmetry, such that the one or more depressions 518 are arranged radially on the face(s) 520 of the cylindrical loader 502 and equidistant from one another. Additionally, or alternatively, the ramp 504 may be arranged such that gravity may cause the support material 104 to roll down the ramp 504 and into the one or more depressions 518. For example, the ramp 504 may be configured such that the support material 104 may roll down the ramp 504 and into a first depression 518 that is most proximal to the ramp 504.

Figure 6:
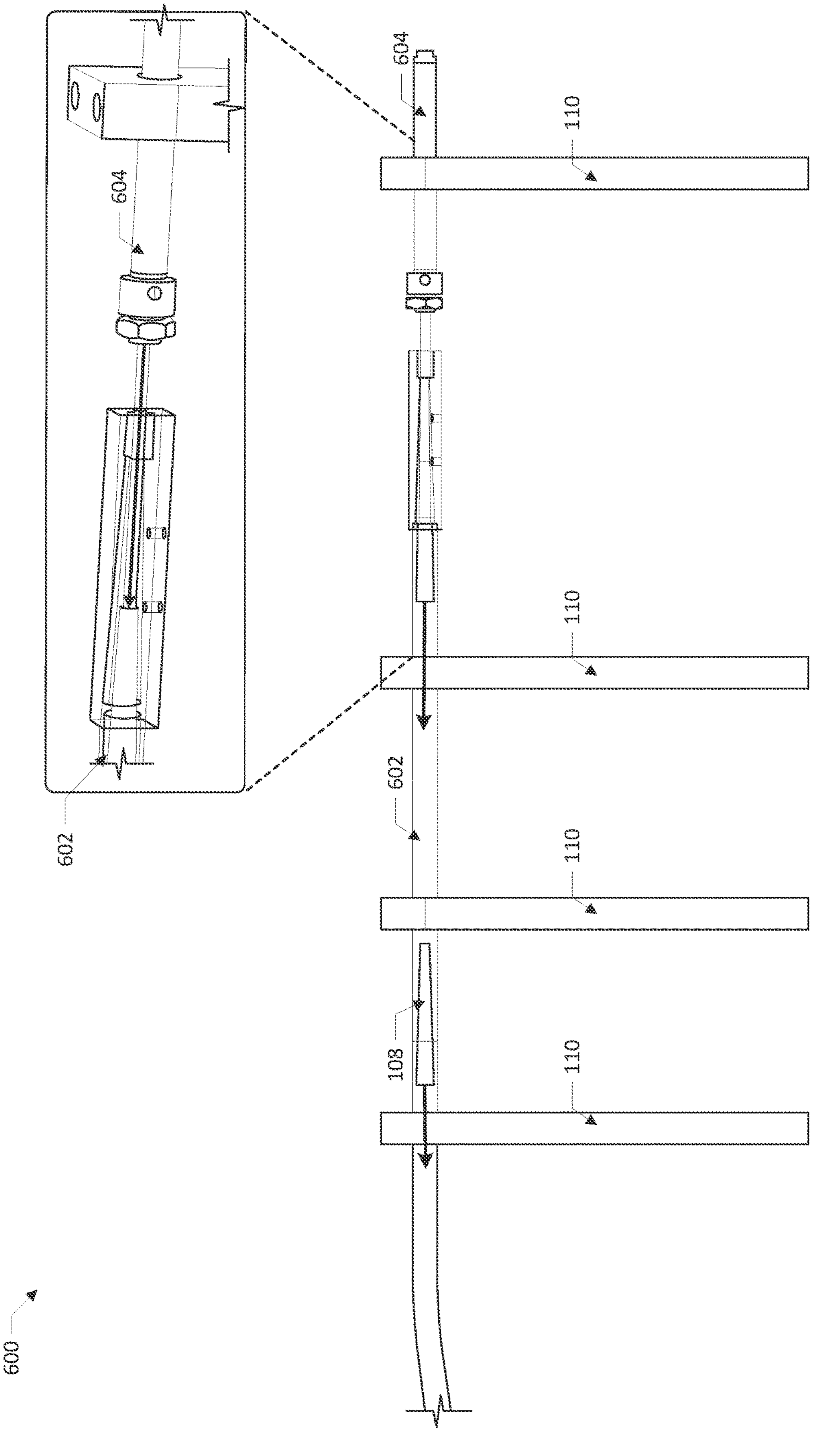
FIG. 6 illustrates a schematic diagram of an example ejector implement.

FIG. 6 illustrates a schematic diagram of an example ejector implement 600. The ejector implement 600 may include the same or similar components and/or attributes of the ejector implement 130 from FIG. 1. The ejector implement 600 that may be arranged in a number of ways. For example, the ejector implement 600 may be secured to the support frame 110. Additionally, or alternatively, the ejector implement 600 may have a standalone support frame 110. Additionally, or alternatively, the ejector implement 600 may have at least one of the motor(s) configured to actuate at least a portion of the ejector implement 600.

In some examples, the ejector implement 600 may include a vacuum guide tube 602 and/or an ejection component 604. In some examples, the vacuum guide tube 602 may be positioned to receive the paper cone 108 from the cavity 212 of the cone shaping implement 116 via the first opening 204 of the cone shaping implement 116. Additionally, or alternatively, the vacuum guide tube 602 may be positioned to receive the paper cone 108 from the cavity 212 of the cone shaping implement 116 via the second opening 208 of the cone shaping implement 116. Additionally, or alternatively, the vacuum guide tube 602 may be configured to create suction configured to assist in removing the paper cone 108 from the cavity 212 and/or transport the paper cones 108 from the cone machine 102 to a storage. Additionally, or alternatively, the ejection component 604 may be configured to assist in ejecting the paper cone 108 from the cavity 212 via the first opening 204 or the second opening 208 of the cone shaping implement 116, whichever end is opposite from the vacuum guide tube 602. For example, if the vacuum guide tube 602 is positioned to receive the paper cone 108 from the cavity of the cone shaping implement 116 via the first end, the ejection component 604 may be positioned to assist in ejecting the paper cone 108 from the cavity 212 via the second opening of the cone shaping implement 116. In some examples, the ejection component 604 may be configured as a nozzle for dispensing air against the support implement 106(*b*) and to assist in removing the paper cone 108 from the cavity. Additionally, or alternatively, the ejection component 130 may be configured as a piston, firing a rod to contact the support material 106(*b*) and to assist in removing the paper cone 108 from the cavity.

Figure 7B:
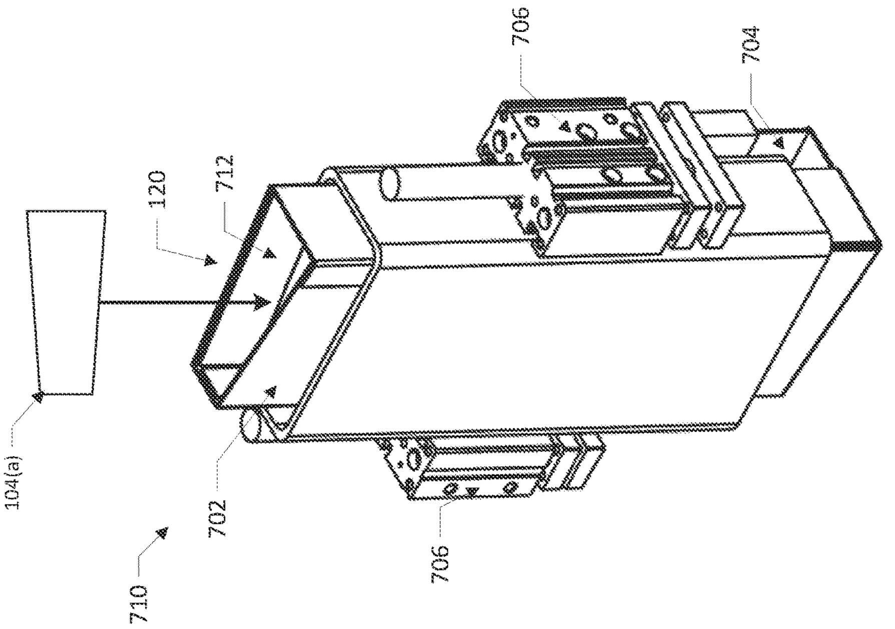
FIG. 7B illustrates a schematic diagram of an example paper loader implement from a second perspective.
Figure 7A:
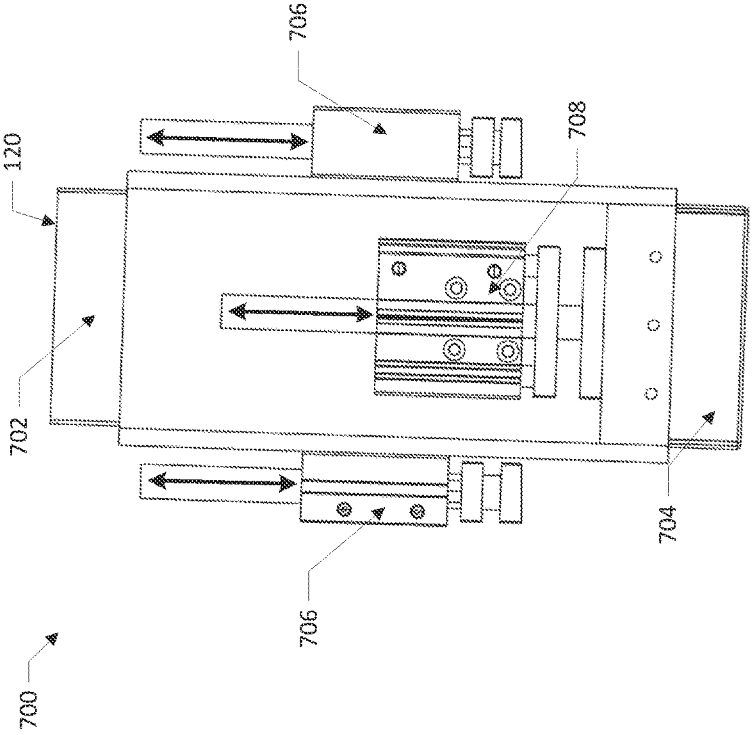
FIG. 7A illustrates a schematic diagram of an example paper loader implement from a first perspective.

FIGS. 7A and 7B illustrate schematic diagrams of example paper loader implements 120 from a first perspective 700 and a second perspective 710, respectively. The paper dispensing implement 120 may include the same or similar components and/or attributes of the paper dispensing implement 120 from FIG. 1. The paper dispensing implement 120 may be arranged in a number of ways. For example, the paper dispensing implement 120 may be secured to the support frame. Additionally, or alternatively, the paper dispensing implement 120 may have a standalone support frame. Additionally, or alternatively, the paper dispensing implement 120 may include a motor configured to actuate at least a portion of the paper dispensing implement 120. The perspectives are included for the sake of clarity and are not intended to be limiting in any manner.

FIG. 7A illustrates a schematic diagram of an example paper loader 120 implement from a first perspective 700. In some examples, the paper dispensing implement 120 may include a removable paper loader 702, a sponge 704, one or more paper loader lift(s) 706, and/or a sponge lift 708. In some examples, the motor may be configured to provide operational power to the paper loader lift 706 and/or the sponge lift 708. In some examples, the paper loader lift 706 may be configured to raise and/or lower the paper loader 702. In some examples, raising and/or lowering the paper loader 702 may facilitate the dispensing of the paper-like material 104(*a*) into the slit 216. Additionally, or alternatively, the sponge lift 706 may be configured to raise and/or lower the sponge 704. In some examples, raising and/or lowering the sponge 704 may cause at least a portion of the paper-like material 104(*a*) to be wetted such that the wetted portion of the paper-like material 104(*a*) may contact a portion that has not been wetted, and form a seal to hold the paper cone 108 together.

FIG. 7B illustrates a schematic diagram of an example paper loader implement 120 from a second perspective 710. In some examples, the paper loader 702 may be sized to receive the paper-like material 104(*a*) situated in a stack one on top of the other, via an opening 712 of the paper loader 702. In some examples, the sponge 704 may contain moisture, such that, when the sponge 704 contacts a portion of the paper like material 104(*a*), the sponge may wet the paper-like material to assist in sealing the paper cone 108 during the shaping process of the paper-like material 104. For example, the sponge 704 may contact a portion of the paper-like material 104 upon entry to cavity 212 via the slit 216. When the cone rolling implement 118 begins rotation, the portion of the paper-like material 104 that has been wetted by the sponge 704 may contact a separate portion of the paper-like material 104, forming a seal of the paper cone 108.

Figure 8:
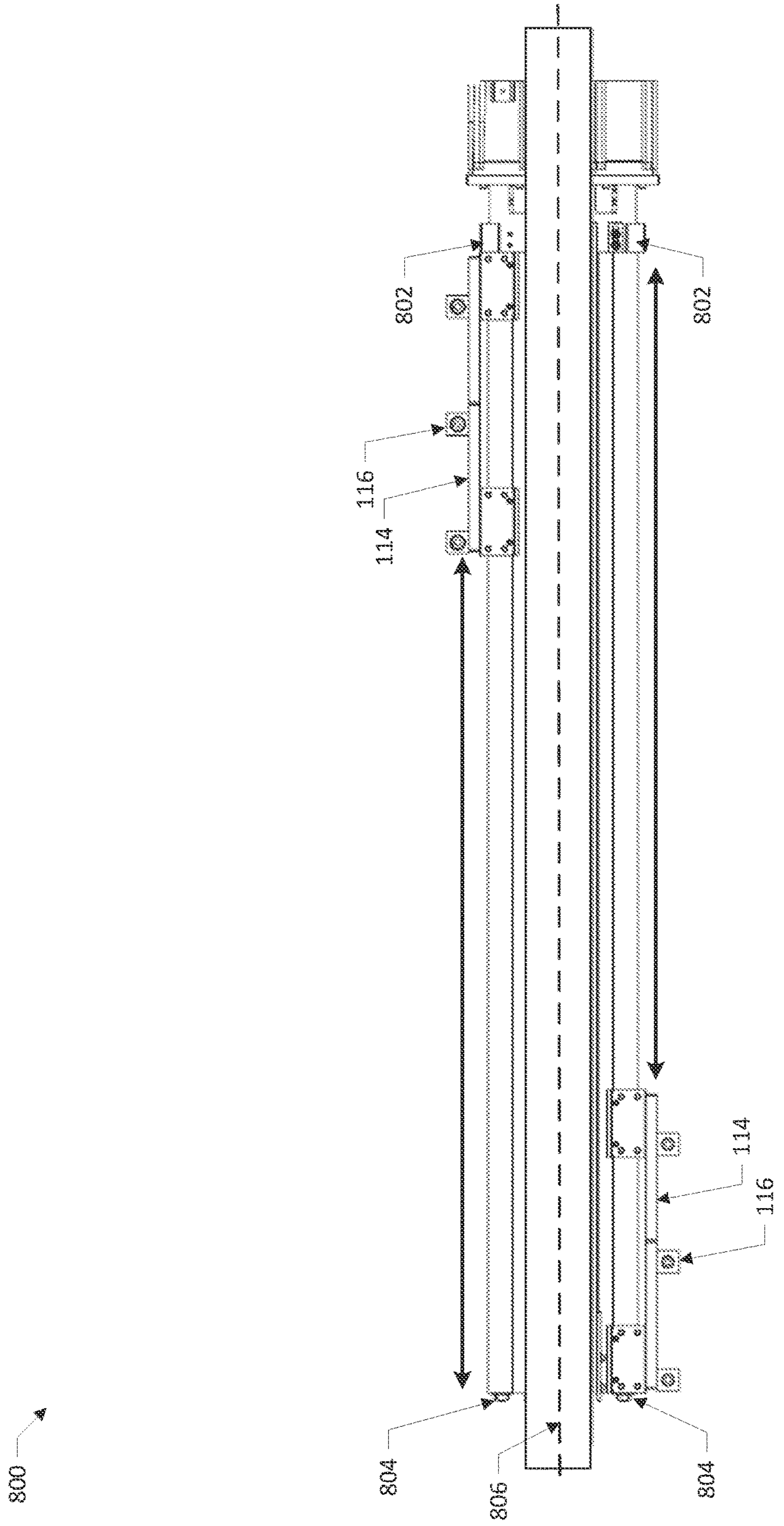
FIG. 8 illustrates a schematic diagram of an example actuator implement.

FIG. 8 illustrates a schematic diagram of an example actuator implement 800. The actuator implement 800 may include the same or similar components and/or attributes of the actuator implement 112 from FIG. 1. The cone machine 102 may include an actuator 800 that may be arranged in a number of ways. For example, the actuator 800 may be secured to the support frame 110. Additionally, or alternatively, the actuator 800 may have a standalone support frame 110.

In some examples, the actuator 800 may be configured to include a first end 802 and a second end 802 being opposite the first end 804. The actuator 800 may further be configured to travel in at least a first direction of travel and a second direction of travel. In some examples, the actuator 800 may be configured using various techniques, such as, for example, as a ball screw having a first end 802 attached to a drive bearing and a second end 804 being opposite the first end 802 and attached to a support bearing. Additionally, or alternatively, the ball screw may comprise a linear motion bearing threaded onto the ball screw and configured to travel between the first end 802 and the second end 804 as the ball screw rotates. In some examples, the actuator 800 may be configured as a pulley, a belt, and/or any other means having a two-way linear direction of travel. In some examples, the actuator 800 may include a transport implement 114 coupled thereto. As an example, an actuator 800 implemented as a ball screw may have the transport implement 114 coupled thereto the linear motion bearing such that the transport implement 114 may travel between ends of the actuator 800 along with the linear motion bearing. Additionally, or alternatively, the transport implement 114 may provide support for one or more additional components, such as, for example, one or more cone shaping implements 116. Additionally, or alternatively, the actuator 800 may be configured to rotate about its longitudinal axis 806, such that, the actuator 800 may be able to facilitate various arrangements of the cone machine 102. For example, the cone machine 102 may be arranged such that some components may be positioned above the actuator 800 and/or some components may be positioned below the actuator 800, and the actuator 800 may travel in the first and/or second direction(s) of travel between the first end 802 and the second end 804 and/or may rotate about the longitudinal axis 806 such that components coupled to transport implements 114 disposed on a top side of the actuator 800 may access components that are positioned on a bottom side of the actuator 800, for example.

Figure 9:
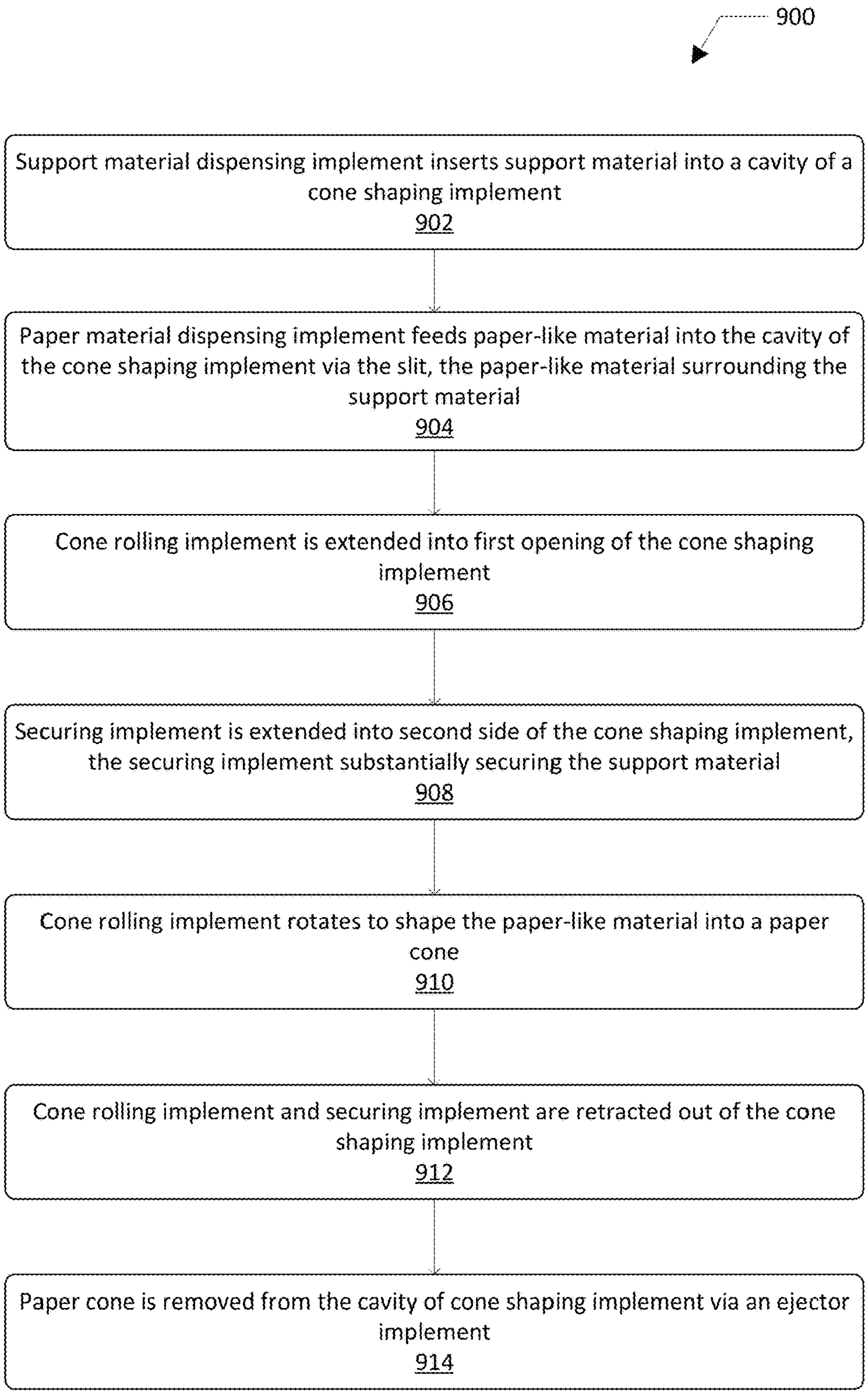
FIG. 9 illustrates a flow diagram of an example process for shaping paper material into a paper cone with an automated paper cone shaping machine.

FIG. 9 illustrates an example process for shaping a paper material 104 into a paper cone 108 including a support material 106 disposed therein with an example shaping and arrangement machine. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-8, although the processes may be implemented in a wide variety of other environments, architectures and systems.

At block 902, the process 900 may include a support material implement inserting a single support material 106 into a cavity 212 of a cone shaping implement 212. In some examples, the user may load the ramp 504 of the support material 106 dispensing implement 122 with a sufficient amount support material 104(*a*) of the user's choosing. In some examples, the user may turn on the cone machine 102 by pressing a button 140 and/or actioning the display 132. Additionally, or alternatively, the user may select the desired operation settings for the cone machine 102 by touching the GUI elements presented on the display 132. Additionally, or alternatively, the user may begin the automated operation of the cone machine 102 by touching a GUI element presented on the display 132. In some examples, the support material dispensing implement 122 may then incrementally rotate, aligning at least one depression 518 of the cylindrical loader component 502 with a cone shaping implement 116 and/or positioning at least one depression 518 of the cylindrical loader component 502 to receive a single one of the support material 104(*a*) via the ramp 504. The actuator 112 may then cause the transport implement 114 to travel in a first direction of travel toward the paper dispensing implement 120.

At block 904, the process 900 may include a paper dispensing implement 120 feeding a single paper-like material 104(*a*) into the cavity 212 of the cone shaping implement 116 via a slit 216 disposed on the cone shaping implement 116. The paper-like material 104(*a*) may be fed into the cavity 212 in such a manner that the paper-like material 104 may surround the support material 106(*b*) disposed in the cavity 212. In some examples, the user may load a removable paper loader 702 with a sufficient amount paper-like material 104(*a*) of the user's choosing. Additionally, or alternatively, the user may turn on the cone machine 102 by pressing a button 140 and/or actioning the display 132. Additionally, or alternatively, the user may select the desired operation settings for the cone machine 102 by touching the GUI elements presented on the display 132. Additionally, or alternatively, the user may begin the automated operation of the cone machine 102 by touching a GUI element presented on the display 132.

At block 906, the process 900 may include a cone rolling implement extending into the first opening 204 of the cone shaping implement 116. In some examples, the first opening 204 may be sized to receive at least a portion of the cone rolling implement 118. The cone rolling implement 118 may extend to the extended state 420 and enter the cavity 212 of the cone shaping implement 116, causing the edge of the member to protrude beyond the exterior surface 318 of the mandrel 310 and contact the portion of the paper-like material 104(*a*) in the cavity 212.

At block 908, the process 900 may include a securing implement 124 extending into the second opening 208 of the cone shaping implement 116. In some examples, the second opening 208 may be sized to receive at least a portion of the securing implement 124. Additionally, or alternatively, the securing implement 124 may be configured to stabilize and/or substantially secure the support material 106. The securing implement 124 may extend to the extended state and enter the cavity from an end of the cone shaping implement 116 that is opposite the cone rolling implement 118. The securing implement 124 may cause the vacuum component 126 to create suction and stabilize and/or substantially secure the support material 106(*a*).

At block 910, the process 900 may include the cone rolling implement 118 rotating to shape the paper-like material 104 into a paper cone 108. The cone rolling implement 118 may begin to rotate and cause the remaining portion of the paper-like material 104(*a*) to enter the cavity 212. As the paper-like material 104(*a*) enters the cavity, the sponge lift 706 may cause the sponge 704 to lower and contact a remaining portion of the paper-like material 104(*a*) prior to its entry into the cavity 212 creating a wetted portion of the paper-like material 104(*a*). The cone rolling implement 118 may rotate in the cone shaping implement 116, causing the wetted portion of the paper-like material 104 to contact a non-wetted portion of the paper-like material 104 and create a seal and form the paper cone 108. As the cone rolling implement 118 continues to rotate, the wetted portion may substantially dry due to friction.

At block 912, the process 900 may include the cone rolling implement 118 and/or the securing implement 124 retracting out of the cone shaping implement 116. For example, the cone rolling implement 118 may retract from the extended state 420 to the retracted state 400, and the securing implement 124 may retract from the extended state to the retracted state. The actuator 112 may cause the transport implement 114 to travel in a second direction opposite the first direction toward the ejector implement 130. In some examples, the cone rolling implement 118 may cease rotation prior to retracting out of the cone shaping implement 116. Additionally, or alternatively, the securing implement 124 may cease suction prior to retracting out of the cone shaping implement 116.

At block 914, the process 900 may include removing the paper cone 108 from the cavity 212 of the cone shaping implement 116 via an ejector implement 130. In some examples, the actuator 112 may position the first opening 204 of the cone shaping implement 116 proximal to the vacuum guide tube 602 and the second opening 208 of the cone shaping implement 116 proximal to the ejection component 604. The ejector implement 130 may cause the vacuum guide tube 602 to create suction. As the suction is occurring, the ejector implement 130 may cause the ejection component 604 to dispense air and/or fire a rod to contact the support material 106(*b*) and assist in removing the paper cone 108 from the cavity. The paper cone 108 exits the cavity of the cone shaping implement 116 via the first opening 204 and travels through the vacuum guide tube 602 leading to a paper cone 108 storage of the users' choice.

As used herein, a processor, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. Alternatively, or in addition, the functionally described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, the processor(s) may possess its own local memory, which also may store program components, program data, and/or one or more operating systems.

The memory may include volatile and nonvolatile memory, removable and non-removable media implemented in any method or technology for storage of information, such as computer-readable instructions, data structures, program component, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which may be used to store the desired information, and which may be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
- a first actuator having a first direction of travel;
- a first implement coupled to the actuator;
- a second implement having a longitudinal axis being substantially perpendicular to the first direction of travel, the second implement comprising:
  - a first end comprising a first opening having a first diameter;
  - a second end comprising a second opening having a first diameter, the second end opposite the first end;
  - a cavity extending between the first opening and the second opening along the longitudinal axis, the cavity being defined by:
    - a first portion extending a first length along the longitudinal axis from the first opening, the first portion being cylindrical in shape and having the first diameter;
    - a second portion extending a second length along the longitudinal axis from the second opening, the second portion being cylindrical in shape and having the first diameter, the second length being greater than the first length; and
    - a third portion connecting the first portion and the second portion, the third portion tapering from the first portion to the second portion along the longitudinal axis from the first diameter to a second diameter that is less than the first diameter, the third portion having a third length that is greater than the second length; and a slit extending from an exterior surface of the second implement to the third portion of the cavity; and a loader comprising:

a shaft having a third end;

a mandrel coupled to the shaft and having a fourth length that is substantially equal to the third length, the mandrel comprising:

a proximal end having a third diameter that is substantially equal to the first diameter and a third opening;

a distal end having a fourth diameter that is substantially equal to the second diameter;

an exterior surface;

a receptacle extending from the third opening a fifth length that is less than the fourth length, the receptacle being sized to receive the shaft; and a channel extending between the exterior surface and the receptacle;

a member coupled to the shaft, the member being disposed within the channel; and a spring disposed in the receptacle between the third end and a fourth end of the receptacle.

2. The system of claim 1, wherein the loader further comprises:

a motor being operably coupled to the shaft, the motor configured to rotate the shaft, the member causing the mandrel to rotate;

an arm coupled to the loader; and a second actuator coupled to the arm, the second actuator having a second direction of travel that is substantially perpendicular to the first direction of travel, and the second actuator being configured to:

extend the arm from a retracted state to an extended state, the extended state positioning the mandrel in the cavity and compressing the spring; and retract the arm from the extended state to the retracted state, the retracted state positioning the mandrel out of the cavity and decompressing the spring.

3. The system of claim 1, further comprising:

a third implement having a dispenser, the dispenser configured to dispense a paper-like material into the cavity via the slit;

wherein the first actuator further comprises a second direction of travel, the first direction of travel being opposite the second direction of travel; and wherein dispensing the paper-like material into the cavity comprises causing the actuator to make a first pass by the third implement in the first direction of travel and a second pass by the third implement in the second direction of travel.

4. The system of claim 1, further comprising:

a third implement comprising one or more depressions arranged on the third implement, the one or more depressions being sized to receive a support material;

a motor being operably coupled to the third implement, the motor configured to align individual ones of the one or more depressions with the first opening; and a piston comprising a rod configured to push the support material disposed in the one or more depressions into the cavity.

5. The system of claim 1, further comprising:

a third implement configured to push material disposed in the cavity from the second end to the first end and out of the first opening of the second implement;

a tube positioned proximal to the first opening and being configured to receive the material that is pushed by the third implement; and wherein the third implement comprises:

a piston having a rod that is configured to push the material; or a nozzle configured to blow air and push the material.

6. The system of claim 1, wherein the loader is a first loader, and further comprising:

a second loader comprising a port having a fifth end;

an arm coupled to the loader; and a second actuator coupled to the arm, the second actuator having a second direction of travel that is substantially perpendicular to the first direction of travel, and the second actuator being configured to:

extend the arm from a retracted state to an extended state, the extended state positioning the fifth end in the second opening, the fifth end being configured to substantially secure at least a portion of material disposed in the cavity; and retract the arm from the extended state to the retracted state, the retracted state positioning the fifth end outside of the second opening.

7. The system of claim 1, further comprising a steel frame configured to support at least the first actuator and the loader.

8. The system of claim 1, further comprising:

an edge disposed on the member, the edge being substantially even with the exterior surface of the mandrel; and wherein the edge comprises at least one of:

a rubber material;

a silicon material;

a nitrile material;

a neoprene material; or a vinyl material.

9. The device of claim 1, wherein the first actuator comprises:

a ball screw; and a linear motion bearing having a top side and a bottom side opposite the top side, the linear motion bearing being threaded onto the ball screw; and wherein the first implement is coupled to the top side of the linear motion bearing.

10. The device of claim 1, further comprising:

a display configured to present a graphical user interface (GUI) on the display;

one or more buttons configured to stop at least the first actuator when actuated; and wherein the GUI is configured to receive input, and at least the first actuator is configured to operate in response to the input.

11. A device having a longitudinal axis, the device comprising:

a first end comprising a first opening having a first diameter;

a second end comprising a second opening having a first diameter, the second end opposite the first end;

a cavity extending between the first opening and the second opening along the longitudinal axis, the cavity being defined by:

a first portion extending a first length along the longitudinal axis from the first opening, the first portion being cylindrical in shape and having the first diameter;

a second portion extending a second length along the longitudinal axis from the second opening, the second portion being cylindrical in shape and having the first diameter, the second length being greater than the first length; and a third portion connecting the first portion and the second portion, the third portion tapering from the first portion to the second portion along the longitudinal axis from the first diameter to a second diameter that is less than the first diameter, the third portion having a third length that is greater than the second length; and a slit extending from an exterior surface of the second implement to the third portion of the cavity, the slit being sized the third length and aligned with the third portion of the cavity.

12. The device of claim 11, wherein the cavity is configured to receive a paper-like material via the slit and from a dispensing implement configured to dispense the paper-like material.

13. The device of claim 11, wherein the cavity is further configured to shape a paper-like material to a first shape substantially similar to a second shape of the third portion.

14. The device of claim 11, wherein the cavity is sized to receive:

a mandrel extending through the first opening; and a securing implement extending through the second opening.

15. A device comprising:

a shaft having a first proximal end and a first distal end;

a mandrel coupled to the shaft and having a first length, the mandrel comprising:

a second proximal end comprising an opening having a first diameter;

a second distal end having a second diameter, the first diameter being greater than the second diameter;

an exterior surface;

a receptacle extending from the opening a second length that is less than the first length, the receptacle being sized to receive the shaft; and a channel extending between the exterior surface and the receptacle;

a member coupled to the shaft, the member being disposed within the channel; and a spring disposed in the receptacle between the first distal end and a point in the receptacle being positioned between the first distal end and the second distal end.

16. The device of claim 15, further comprising an edge disposed on the member, wherein the edge comprises at least one of:

a rubber material;

a silicon material;

a nitrile material;

a neoprene material; or a vinyl material.

17. The device of claim 16, wherein the edge has a first level of friction, and the exterior surface has a second level of friction, the first level of friction being greater than the second level of friction.

18. The device of claim 16, further comprising:

a motor being operably coupled to the shaft, the motor configured to rotate the shaft, the member causing the mandrel to rotate;

an arm coupled to the motor; and an actuator coupled to the arm, the actuator being configured to:

extend the arm from a retracted state to an extended state, the extended state compressing the spring and positioning the mandrel in a cavity sized to receive the mandrel; and retract the arm from the extended state to a retracted state, the retracted state decompressing the spring and positioning the mandrel out of the cavity.

19. The device of claim 18, wherein compressing the spring causes at least a portion of the edge to protrude through the channel and past the exterior surface.

20. The device of claim 19, wherein decompressing the spring causes at least a portion of the edge to rest substantially level with the exterior surface.

* * * * *